United States Patent [19]
Flores et al.

[11] Patent Number: 6,058,413
[45] Date of Patent: May 2, 2000

[54] METHOD AND APPARATUS FOR UTILIZING A STANDARD TRANSACTION FORMAT TO PROVIDE APPLICATION PLATFORM AND A MEDIUM INDEPENDENT REPRESENTATION AND TRANSFER OF DATA FOR THE MANAGEMENT OF BUSINESS PROCESS AND THEIR WORKFLOWS

[75] Inventors: Rodrigo F. Flores, Berkeley; Pablo A. Flores, Alameda, both of Calif.; Raul Medina-Mora Icaza, Mexico City, Mexico; Thomas E. White, Monte Sereno, Calif.; John A. McAfee, Kensington, Calif.; Manuel Jasso Nuñez, Alameda, Calif.; Thomas G. Buchler, Berkeley, Calif.; Roy I. Gift, San Anselmo, Calif.

[73] Assignee: Action Technologies, Inc., Alameda, Calif.

[21] Appl. No.: 08/855,214

[22] Filed: May 13, 1997

Related U.S. Application Data

[63] Continuation of application No. 08/420,337, Apr. 11, 1995, abandoned, which is a continuation of application No. 08/023,056, Feb. 25, 1993.

[51] Int. Cl.$^7$ .................................................. G06F 9/46
[52] U.S. Cl. ................................................ 709/101; 705/7
[58] Field of Search .................................. 395/671, 682; 705/7, 8; 709/100–108, 300–305

[56] References Cited

U.S. PATENT DOCUMENTS 5,630,069  5/1997  Flores et al. .................................. 705/7

*Primary Examiner*—Alvin E. Oberley
*Assistant Examiner*—St. John Courtenay, III
*Attorney, Agent, or Firm*—Blakely Sokoloff Taylor & Zafman

[57] ABSTRACT

The present invention is a method and apparatus which is used to enable application developers to generate workflow enabled applications which request services from the workflow server component of the workflow system, remotely and indirectly using messaging, shared databases or inter-process communications. The present invention provides a standard transaction format (STF) for accessing such a workflow system through STF processors via messaging, updates to the shared databases or inter-process communications. Workflow enabled applications are used by users to act and participate in business processes and enable users and managers to observe and query the status of workflows and business processes.

11 Claims, 7 Drawing Sheets

METHOD AND APPARATUS FOR UTILIZING A STANDARD TRANSACTION FORMAT TO PROVIDE APPLICATION PLATFORM AND A MEDIUM INDEPENDENT REPRESENTATION AND TRANSFER OF DATA FOR THE MANAGEMENT OF BUSINESS PROCESS AND THEIR WORKFLOWS

This is a continuation of application Ser. No. 08/420,337, filed Apr. 11, 1995 now abandoned which is a continuation of Ser. No. 08/023,056 filed Feb. 25, 1993.

BACKGROUND OF THE INVENTION

1. Field of the Invention

Businesses are demanding new systems that directly support the management of business processes, systems that bring order and coordination to the flow of work. They are seeking to automate that part of office work that has been impervious to conventional data processing and information processing systems, which were not designed for business process management and are not well-suited to help with it.

The present invention is part of a system that, when implemented in software, provides businesses with the tools they need to manage business processes efficiently and cost-effectively.

The invention can be applied to such a system, whether the system is a simple application, such as intelligent forms routing, to sophisticated mission-critical enterprise-wide systems that integrate all marketing, production, and customer fulfillment processes.

The resulting system enables users of the system to take coordinated action quickly and to manage processes painlessly. The results are increased productivity, reduced cycle time and hence, improved customer satisfaction.

Workflow-enabled systems facilitate business processes. To do so, a workflow management system performs eight key functions:

Notifies the user that he or she has a step to begin or to complete.

Provides the user with the proper tools to complete a task.

Provides the user with the proper information to complete a task.

Allows the user to see where a task fits in the overall process.

Manages the proper reminders, alerts, and follow-ups to keep the process moving.

Automates certain standard procedures.

Integrates with the organization's existing business systems.

Provides simple application program interfaces (APIs) that allow developers to develop new custom applications that are workflow-enabled.

The workflow system's architecture is designed to fit within a variety of computer systems, collecting around itself not only specific applications, but also system enhancements and utilities from users and third-party developers. In addition, the architecture is designed to allow for interoperability among different applications and across diverse platforms.

A fundamental concept of a workflow system is that any business process can be interpreted as a sequence of basic transactions called workflows. Every workflow has a customer, a performer, and conditions of satisfaction. The customer and performer are roles that participants can take in workflows. In addition, each workflow can have observers.

In a workflow, the customer is the person for the sake of whom the work is done, either because they made a request or accepted an offer. It is customers who are responsible for evaluating performed work and determining whether this work meets their conditions of satisfaction.

The performer is the person who is responsible for completing the work and for declaring to the customer when the work is done.

Requests and Offers are the two basic types of workflows. There are other workflow types such as Question, Inform and Note that are simplified derivations of Request and Offer. The conditions of satisfaction specify the work to be performed by the performer. In a request, the customer specifies the conditions of satisfaction, and in an offer the performer specifies them. (Then, of course, the two can enter into negotiation about the work to be done.)

For example, given the sentence:

"John asked Frank to prepare the report and deliver it by noon on Friday,"

John is the customer for this workflow, Frank is the performer, and the conditions of satisfaction are "prepare the report and deliver it by noon on Friday." Further, because John asked for the report rather than Frank offering it, this workflow is of the type Request.

Given the sentence:

"John proposed to prepare the report and deliver it by noon on Friday for Frank,"

John is the performer for this workflow, Frank is the customer, and the conditions of satisfaction are still "prepare the report and deliver it by noon on Friday." Further because John proposed the report rather than Frank asking for it, this workflow is of the type Offer.

Observers of workflows take no direct action; they usually observe for management or training purposes.

Business process maps display the workflows as loops, and display the relevant information about each workflow—the customer, the performer, the conditions of satisfaction and the cycle time. FIG. 1 is a business process map having a primary workflow 11, conditional workflows 13 and 15, a conditional link 17, parallel workflows 19 and 21, serial workflows 23 and 25. In a workflow system of the type used in conjunction with the present invention, associated with each workflow are various parameters such as roles, cycle time, conditions of satisfaction or associated semantics to the links that imply automated action or provide the framework for application building, all of which are necessary to create a useful business process representation.

Each workflow has four phases as shown in FIG. 2. The first phase is called the proposal phase during which a request is made of the prospective performer by a customer or an offer to a customer is made by a prospective performer. The second phase is called the agreement phase during which the offer is accepted by the customer or the request is agreed to by the performer and conditions of satisfaction are identified. Of course, during the agreement phase the original conditions of satisfaction can be negotiated by the customer and performer until an agreement is reached. The third phase is called the performance phase during which the performer undertakes to meet the agreed to or accepted conditions of satisfaction. When the performer believes that the conditions of satisfaction have been met, the performer declares completion. The last phase is the satisfaction phase during which the customer determines whether or not the conditions of satisfaction have been met by the performer, and if so, declares satisfaction.

A workflow system incorporates the following components which are shown in FIG. 3, a workflow server and databases, application program interfaces (APIs) and workflow server manager. In addition, a complete workflow system of the type in which the standard transaction format (STF) processors of the present invention may be utilized includes an application builder, analyst, workflow enabled applications and reporter components. The application builder, analyst, workflow enabled applications and reporter components, while useful components of a complete workflow system, do not form part of the present invention and details concerning such components are set forth herein only as needed for an understanding of the invention. The present invention is concerned mainly with STF processors used in combination with a complete workflow system.

A workflow system provides certain services as follows:

transactions services which are those related to initiating and acting in workflows by users and agents;

definition services which are those related to defining the elements of a business process and its workflows and workflow links;

names and routing services which are those related to defining organizational roles and identities;

configuration services which are provided to the system administrator through a specific configuration database;

scheduling services which allow an authorized user to create, modify and delete records of scheduled business processes; and STF processing services which are provided by the server to STF processors (which are the subject of the present invention as described below) through an STF queue database.

Further details concerning the definition services, names and routing services, configuration services and scheduling services are set forth in co-pending U.S. Ser. No. 08/014,796 filed Feb. 8, 1993. The present invention is directed to the STF processing services provided by a workflow system as well as STF processors.

In addition to the foregoing services provided by a workflow system, external interfaces to the system provide services that are used by end-user applications, the workflow application builder, the workflow reporter and the STF processors.

A workflow system utilizes a workflow server which concentrates workflow operations in the server rather than in the end user applications.

All work done by the server is performed by one of three processes which are referred to as the transaction manager, follow-up manager and date/time schedule manager. Processes are software components or tasks that are architected to run as separate entities from each other. The workflow server controls the three basic processes based upon workflow system server administration data in a configuration database in the following manner. First, it determines when to run the transaction manager and spawns that process. Second, it determines when to run the follow-up manager and spawns that process. Third, it determines when to run the date/time schedule manager and spawns that process.

These processes may be separate executables or simply separate tasks within the body of the workflow system server.

A workflow system also utilizes:

a definitions database which contains records of the definitions of the organizations, business processes, workflows, roles, and acts;

a transactions database which contains records of the enactment of workflows;

a names/routings database which contains records of the roles and identities of the organization where the workflow system is installed;

a schedule database which stores the date and time when a business process must be initiated;

an administration/configuration database which stores information needed by the workflow server to operate; and a STF queue database which stores the records of notifications to be sent to users that interact with the workflow system through an STF processor interface.

The remaining elements of a workflow system are:

1) Workflow APIs which provide a programming interface to access the services of the workflow server. Workflow enabled applications, STF processors and the application builder are all developed using these APIs. APIs of a workflow system are as follows: transactions API, definitions API, reporter API, names and routings API, schedule API and administration API.

2) Workflow server manager which is a component of the workflow system that provides a user interface for specific maintenance and administration services of the workflow server.

3) Workflow application builder which is a Graphical User Interface (GUI) application that allows a business process designer to specify the business process design with its network of workflows and to automatically generate the definitions needed for a workflow enabled application to work.

4) Workflow analyst which is a GUI application that allows a business process analyst to specify the map of business processes with its network of workflows.

5) Workflow reporter which is a GUI application that provides an interface to the transaction databases through the workflow reporter API of the system.

6) Workflow-enabled applications which interface to the server via the workflow APIs or via direct access to the transactions database of the workflow server, or via the use of an STF processor which can use different interfacing mechanisms such as messaging, database or inter-process communication.

7) STF processors which are a set of mechanisms for developing workflow-enabled applications are provided in a workflow system through the definition of a standard transaction format (STF). Such STF processors are the subject of the present invention.

In U.S. Ser. No. 600,144 filed Oct. 17, 1990 and U.S. Ser. No. 07/368,179 filed Jun. 19, 1989, both owned by Action Technologies, Inc., the assignee of the present application, methods and systems for managing workflows, called conversations in the referenced applications, are described. However, the teachings in the cited references are limited to single workflows with no capability for mapping business processes made up of a number of workflows linked together. In U.S. Ser. No. 08/005,236 filed Jan. 15, 1993 now U.S. Pat. No. 5,630,069, a method and apparatus are disclosed for creating and modifying business process maps which is a desirable but not necessary component of a workflow system. This component is referred to as the workflow analyst. In U.S. Ser. No. 08/014,796 filed Feb. 8, 1993, a method and apparatus are disclosed for implementing a complete workflow system for managing business processes and their workflows.

BRIEF SUMMARY OF THE INVENTION

The present invention is a method and apparatus which is used to enable application developers to generate workflow enabled applications which request services from the workflow server component of the workflow system, remotely and indirectly using messaging, shared databases or inter-process communications. The present invention provides a standard transaction format (STF) for accessing such a workflow system through STF processors via messaging, updates to the shared databases or inter-process communications. Workflow enabled applications are used by users to act and participate in business processes and enable users and managers to observe and query the status of workflows and business processes.

In describing the invention, the following terms with their indicated definitions are used:

Act

Basic linguistic occurrence by which people intervene in moving a workflow towards completion.

Agreement

The outcome of the negotiation phase, in which two parties come to a common agreement of the conditions of satisfaction.

Business Process

A network of workflows linked together that represent the recurrent process by which an organization performs and completes work, delivers products and services and satisfies customers.

Business Process Map

This is a graphical representation of business process, which shows its workflows and their relationship.

Primary Workflow

This is the first workflow which is initiated when a business process is initiated. Its condition of satisfaction represent the condition of satisfaction of the business process.

Conditional Link

A link that indicates that only one of a group of workflows will be triggered based on some condition.

Conditions of Satisfaction

Conditions declared by or agreed to by a customer. The fulfillment of which is the purpose of a workflow.

Customer

The role in a workflow who makes a request or accepts and offer.

Customer Satisfaction

The objective of a workflow, the accomplishment of which is declared by the customer when the conditions of satisfaction in the workflow have been fulfilled.

Cycle Time

A measure of the time from initiation to successful completion of a workflow phase, a complete workflow or a business process.

Exception Flow

The path in the business process workflow map which is followed if a customer cancels or a performer revokes or declines.

Link

A defined dependency between two workflows and the mechanism by which dependencies between workflows is established.

Loops (Workflow)

A workflow is represented graphically by an elliptical loop with arrows shown in a clockwise direction wherein each quadrant of the ellipse signifies different phases of the workflow.

Normal Flow

This is the path followed in a business process map when workflows complete with customer satisfaction.

Observer

A role in a workflow who cannot perform acts in the workflow, but is informed of acts in the workflow, and has access to the information and data associated with the workflow.

Offer

The act by which the performer can initiate a workflow, specifying conditions of satisfaction that he is willing to satisfy for a customer.

Organization Roles

Named positions in an organization who are authorized to make certain requests, agreements, take certain actions, set certain policies, and make certain decisions. The kind of roles will be accountant, office manager, etc.

Performer

One of the principal roles in a workflow: the role that commits to complete the conditions of satisfaction.

Phase

A characterization of the status of a workflow based on the acts that have happened and the acts that are permitted. Each workflow has four phases namely, the proposal phase the agreement phase, the performance phase and the satisfaction phase Request A customer does this act to initiate a workflow and declare conditions of satisfaction.

Trigger

An action in a workflow which causes an action in some other workflow.

Triggered

Action in a workflow based on certain conditions/status in some other workflow.

Workflow

A structured set of acts between customers and performers organized to satisfy a customers conditions of satisfaction.

Workflow Activation

A triggered action that enables the customer or performer of the workflow to take the initial act of the workflow.

Workflow Initiation

An act of request or offer initiates a workflow.

Workflow Roles

The association of participants in the workflows that take the acts in workflows; three roles are distinguished in workflows: customer, performer, and observer.

Workflow Type

This indicates whether the workflow is of request, offer or note type.

DETAILED DESCRIPTION OF THE INVENTION

Overview

Figure 1:
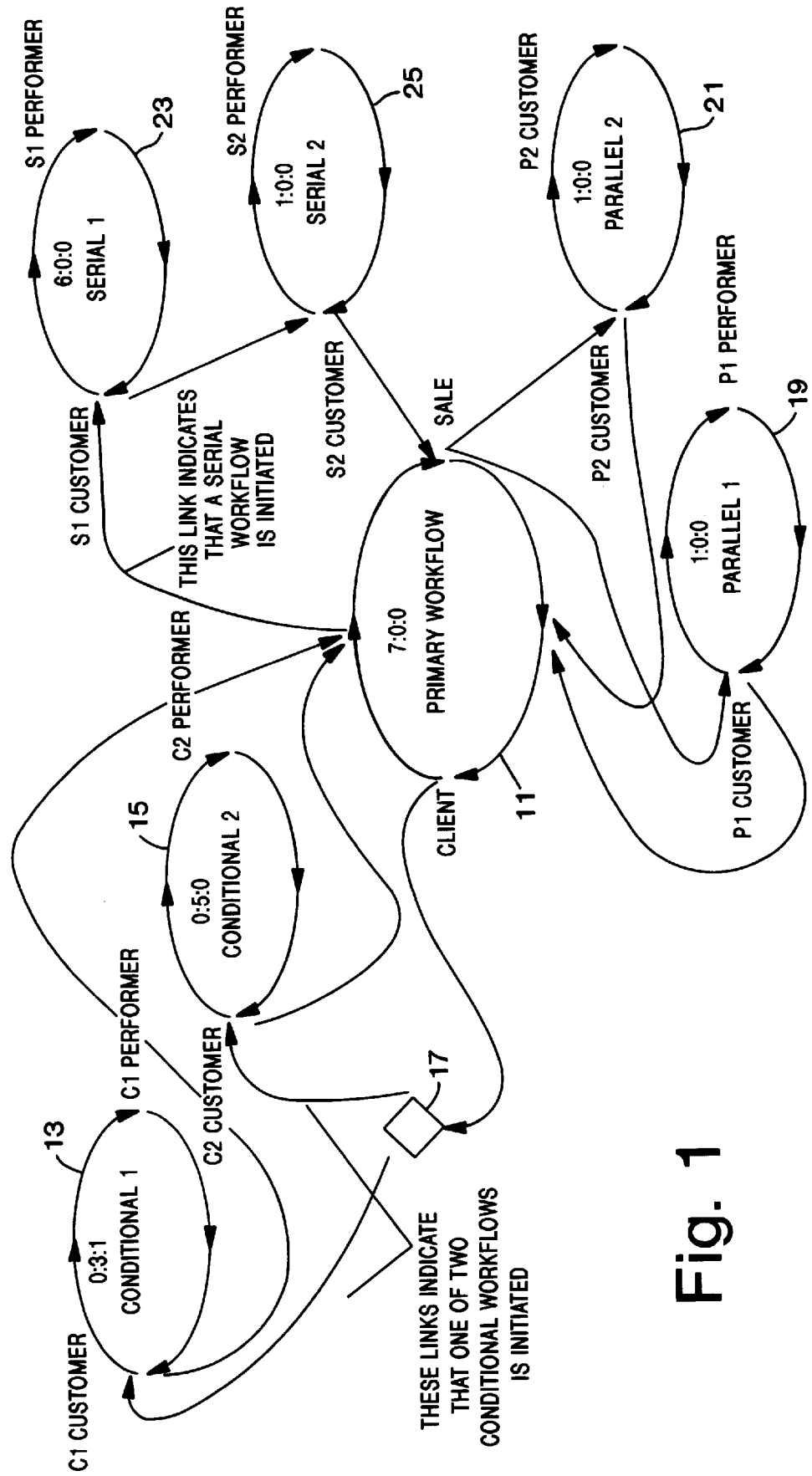
FIG. 1 is pictorial representation of a business process, i.e., a set of linked workflows.
Figure 2:
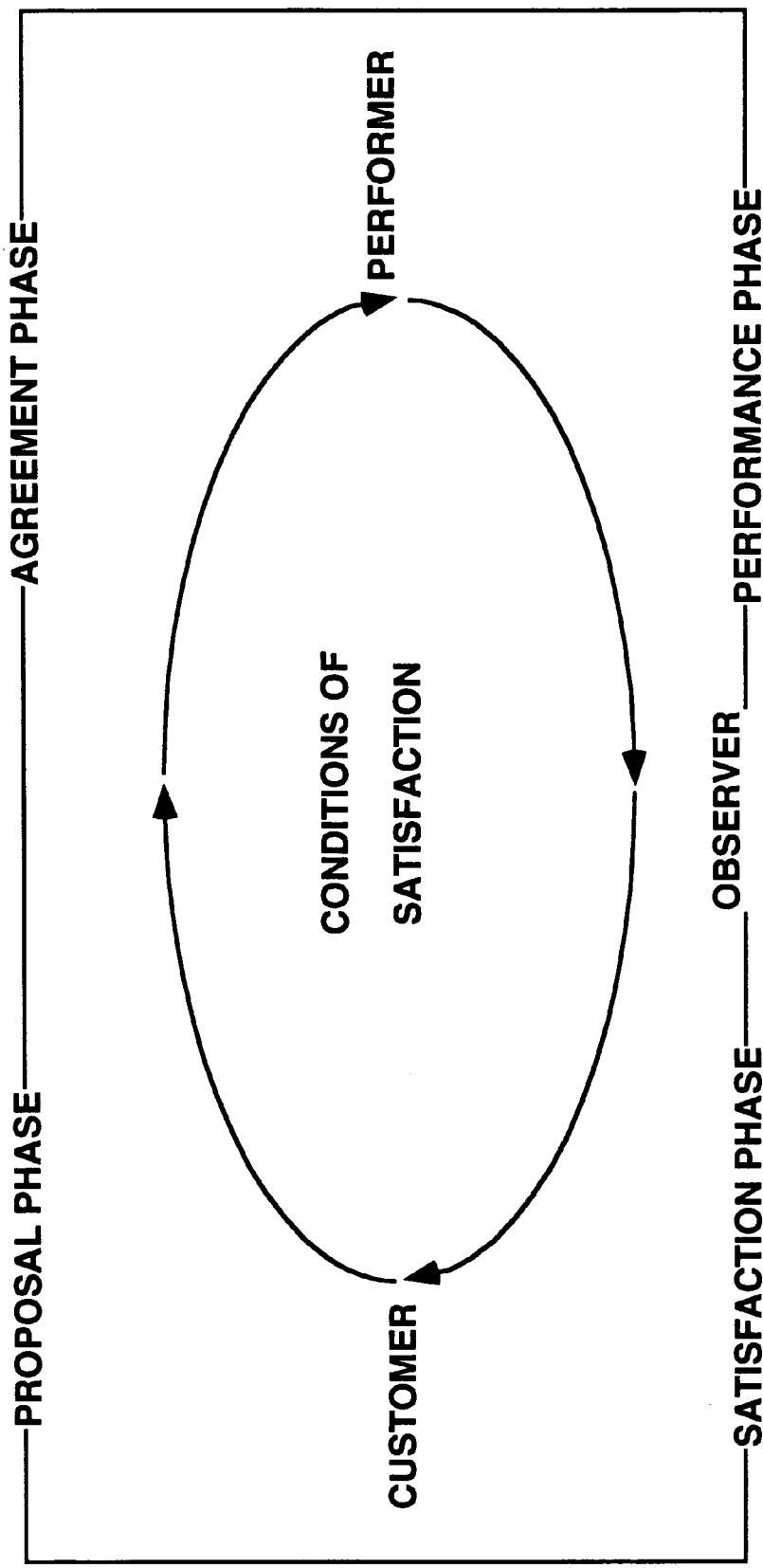
FIG. 2 shows the phases of a workflow.

The present invention is directed to a Standard Transaction Format (STF) specification to address the requirements of applications, platform and medium independent representation and transfer of data related to business processes of a workflow system. The present invention is also directed to STF processors which are the modules that provide the server-side connection point for client/server interactions using any of several STF specification variants. These STF specification variants are messaging, updates to shared databases and inter-process communications. By accessing STF processors workflow enabled applications, using a standard transaction format, are able to request services from the workflow server component of the workflow system, remotely and indirectly using messaging, shared databases or inter-process communications. In other words, the STF specification defines the semantics for accessing the workflow services.

For each one of these types of interfaces there is a syntactic definition that gives the specific format for the representation of the workflow data and the process specific data in that medium. This syntax definition constitutes an STF specification that a particular workflow enabled application will then use.

The communication and interface between workflow enabled applications and the server is provided by STF processors. These STF processors map and translate between a workflow-enabled application's data format and the data elements of the workflow system APIs.

STF processors provide a layer for integration of many different protocols and technologies. STF processors can be constructed for any message transport database technology, and inter-process communication protocol.

The interface from STF processors to the server is accomplished through the workflow system APIs. From the point of view of workflow services, the STF processors appear to the server as additional applications.

Since an STF processor is an application whose job is to interface external systems to the workflow system, there is one STF processor for each different type of system that interfaces to the workflow system.

Business processes can be managed across platforms in diverse locations with diverse interconnections through the management of a class of transaction called STF transactions. Transactions include taking acts, getting reports of status, and notifications of acts taken by other workflow participants, among others.

Three classes of STF processors are described, which are characterized by the method of connection between client and server, which, as previously noted are: messaging, shared database, and inter-process communication. Within these interfaces, STF processor variants are required to conform to the various syntactic requirements of the communication technology. The particulars of such variants depend upon such syntactic requirements, however, the implementation details of such STF processor variants should be apparent to persons skilled in the art having knowledge of the syntactic requirements and the descriptions contained herein.

The client/server communications medium determines whether a client application can run synchronously with the server—making server requests and receiving server responses during the duration of a connection, or asynchronously—making server requests, disconnecting, and reconnecting later for responses. Inter-process communications media typically allow synchronous connections between client and server, message based media typically allow only asynchronous communication between client and server, and clients and servers which communicate through a shared database can operate either synchronously or asynchronously.

Thus, while STF processors may be provided for several STF specification variants, an STF processor with generic functional requirements is described. Further, this description focuses particular attention to the requirements of an STF processor for a messaging platform known as MHS (message handling system) available from Novell Corporation which will serve as an example case.

Figure 4:
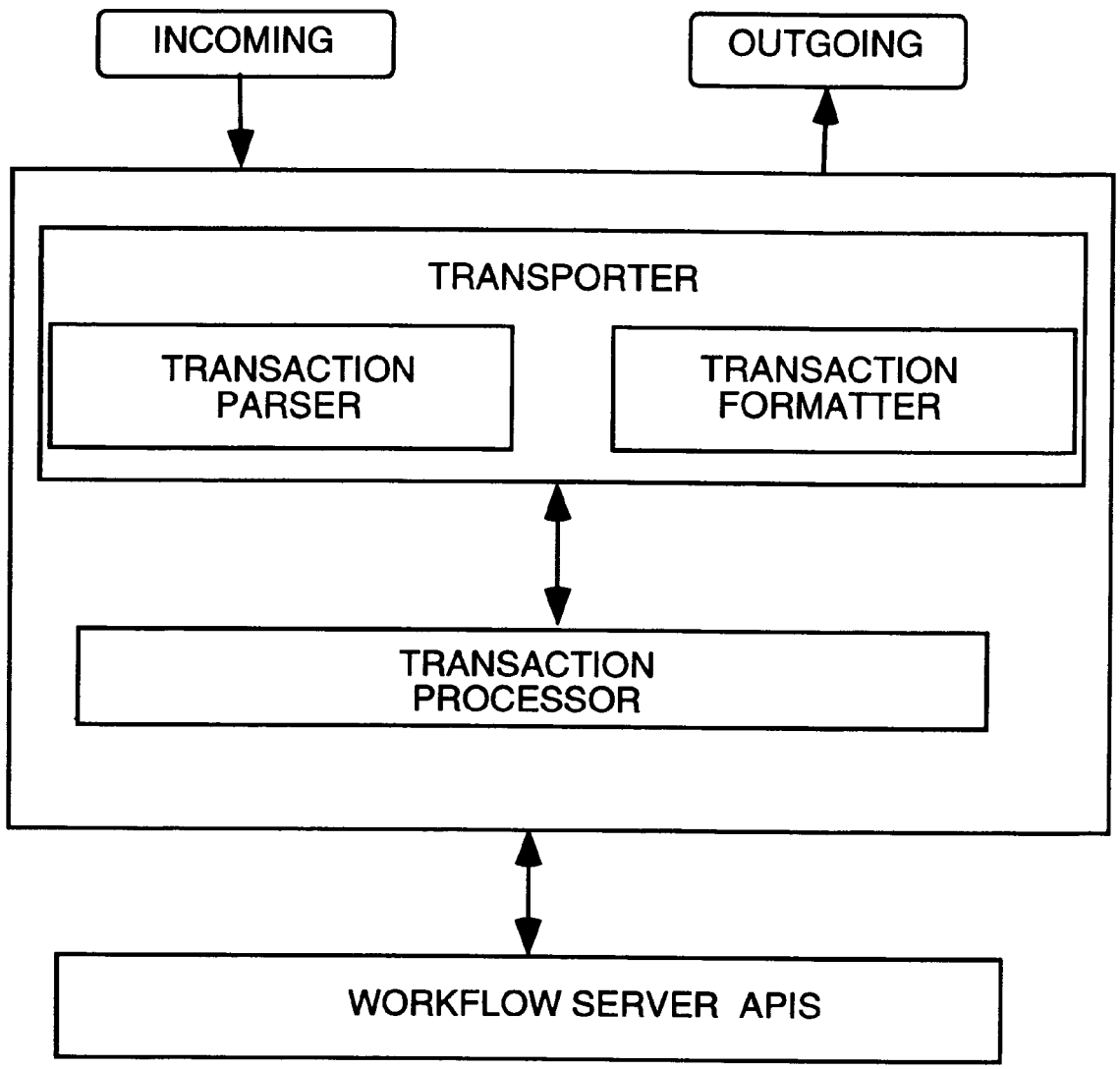
FIG. 4 is a block overview diagram showing the major components of an STF processor.

FIG. 4 shows the major components of an STF processor, namely, a transporter module, which includes a transaction parser and a transaction formatter, and a transaction processor module. The transaction processor module processes STF transactions received from workflow enabled applications through the transporter module and sent to workflow server via calls to the workflow server APIs. Similarly, it processes transactions queued by the workflow server and passes them to the transporter module to be sent to the WEA. The transaction processor is environment independent. The transporter module is adapted to the STF environment (i.e., messaging, shared database or inter-process communication) and receives incoming transactions from a messaging application, shared database or inter-process communication and sends outgoing transactions to a messaging application, shared database or inter-process communication.

The workflow transactions API provides an interface to the workflow server. The workflow server responds to transactions it finds in the transactions database and updates the workflow and places status information in the STF queue database to be processed by STF processors.

STF Transactions

An STF transaction is a workflow transaction defined in a specific format called Standard Transaction Format (STF). This standard enables any application to interface to the workflow server. An application is said to be a Workflow Enabled Application (WEA) when it is able to send/receive the workflow transactions in STF. STF transactions are passed from the STF processor to the workflow server via calls to the transactions API.

Figure 5:
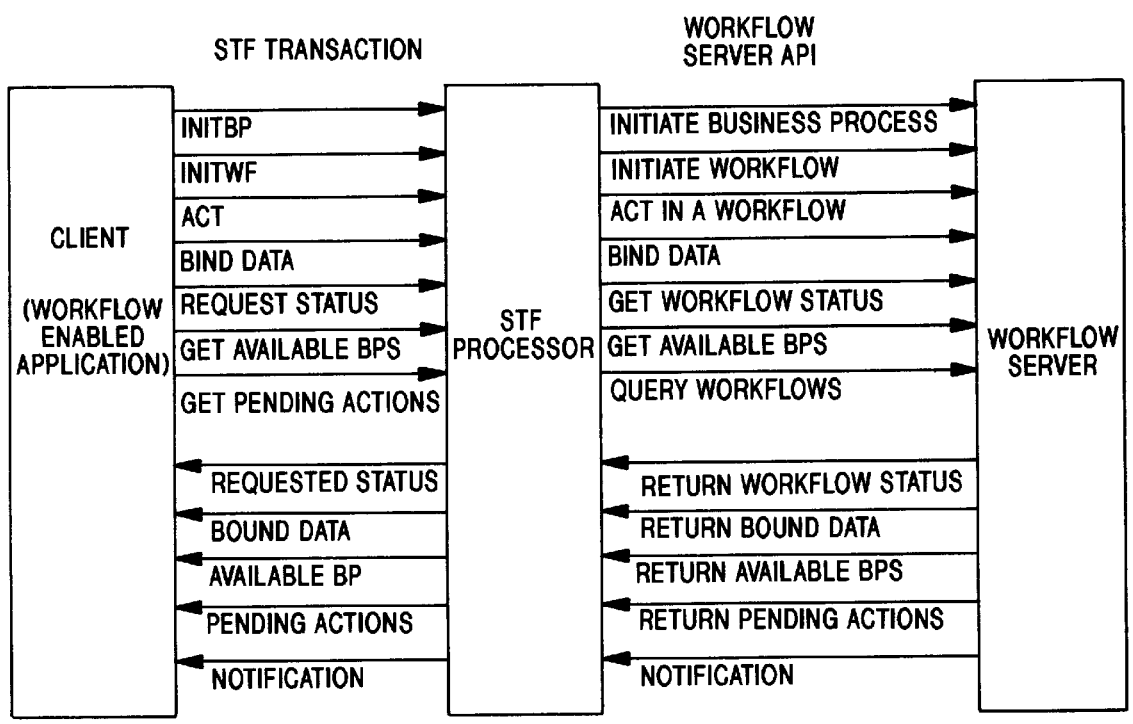
FIG. 5 shows the exchange of STF transactions between a workflow enabled application, the STF processor and server.

An STF transaction is composed of an envelope and workflow data. The envelope provides connection and addressing information translated by STF processors to formats appropriate for the particular medium supported by the STF processor. Workflow data includes workflow specific data and bound process data. STF transactions are exchanged between client and server as shown in FIG. 5. The figure shows some types of transactions as well as the role of the STF processor.

There are five STF transaction types as follows:

Initiating a workflow

Acting in a workflow

Requesting the status of a workflow

Requesting list of declared business processes

Requesting list of workflows with pending actions

Components of STF Transactions

STF Envelope

The STF envelope is entirely platform and medium dependent. The envelope contains addressing information. In a messaging environment, the STF envelope would typically specify user and STF processor email addresses or equivalent. In an IPC environment (connection oriented), the STF envelope would typically specify a logical unit identifier or equivalent. In a database environment, the STF envelope would typically specify user and STF processor identifications or equivalent.

It contains STF Processor ID for identification of a particular STF processor. Essentially this is the address with which a WEA sends an STF transaction.

For example, to address an STF processor STFPROC1 in work group ATI, a WEA in a messaging environment might specify the STF processor address as follows:

To: STFPROC1@ATI

Workflow Data

As previously noted, workflow data includes workflow specific data and bound process data.

Workflow Specific Data

All workflow transactions include a set of required workflow specific data elements that are defined by the STF specification.

The workflow specific data component of an STF transaction contains workflow attributes required to do each of the five types of transactions. Each type of STF transaction has a different set of workflow information. The STF transaction sent by a WEA must contain a Transaction ID (STFID) keyword. This aids the WEA and STF processor in identifying a transaction uniquely and helps the STF processor in sending status transactions to the WEA. Each STF transaction also has a set of mandatory parameters called minimal transaction parameters. Each STF transaction may also contain other optional parameters which are called extended set parameters.

An example of a minimal set of parameters for the workflow specific data component of an STF transactions is as follows:

STF type (transaction type)

STF transaction identification

An example of an extended set of parameters for the workflow specific data component of an STF transactions is as follows:

workflow participants or users workflow type transaction type expected and/or requested workflow completion dates workflow status Bound Process Data Bound process data are data elements which are managed by the workflow server for purposes of management and as values in assignment, calculation, and flow control statements. Bound data elements are application-specific extensions to the STF specification. Examples include sales price, image data, and quantity ordered. These additional data elements can be used in processing and display definitions of client applications and the processing and control of business process definitions at the workflow server. For example, a time sheet submission workflow includes bound process data in the form of project names and hours worked. The business process definition might specify that the sum of hours worked on a particular day is used to calculate an employee's paycheck amount which is used in a recurrent automated workflow to cut a pay check.

The STF interchanges shown in FIG. 5 are realized via client applications, STF processors, and workflow server interfaces. For example, a workflow enabled application may use MHS messages to send STF transactions to the workflow server. STF transactions are sent as attachments to MHS messages. The STF processor receives these messages, identifies the STF transaction, parses the transaction and passes information as required to the workflow server.

Mapping Between STF Transactions And Workflow Server APIs

The workflow server APIs provide the following functions:

Initiate a workflow

Act in a workflow

Bind process data

Get bound process data

Get field attributes

Get Workflow Status

Get Available acts

Get Available Business Processes

Get Workflows in progress and pending actions

The STF transaction set is designed to facilitate the invocation of workflow server API functions and to return status reports. Workflow server API functions to STF transaction mapping is shown in Table 2. Descriptions of the specified workflow server APIs may be found in co-pending U.S. application Ser. No. 08/014,796 filed Feb. 8, 1993.

TABLE 2

| STF Transaction (Transaction Keyword) | AWS APIs called by STF Processor and their purposes |
|---|---|
| Initialising a Business Process (InitBP) | BeginTransaction AWSTBEGINTRANSACTION () Initialise Business Process AWSTINITBP () Bind Application Data to the BP AWSTBINDAPPDATA () End Transaction AWSTENDTRANSACTION () |
| Initialise a Workflow (InitWF) | BeginTransaction AWSTBEGINTRANSACTION () Initialise workflow AWSTINITWF () Bind Application Data to the WF AWSTBINDAPPDATA () End Transaction AWSTENDTRANSACTION () |
| Take an Act in a WF (Act) | BeginTransaction AWSTBEGINTRANSACTION () Take an Act in the WF AWSTACTINWF () Query the Status of the Act AWSTACTSTATUSQUERY () Bind Application Data to the WF or BP AWSTBINDAPPDATA () End Transaction AWSTENDTRANSACTION () |
| Bind Application data to a Workflow (Bind Data) | BeginTransaction AWSTBEGINTRANSACTION () Bind Application Data to the WF or BP AWSTBINDAPPDATA () End Transaction AWSTENDTRANSACTION () |
| Get the status of a Workflow (GetWFStatus) | Get the status and dates of the WF AWSTSTATUS () Get the number of available acts AWSTNUMAVAILABLEACTS () Get the available acts AWSTAVAILABLEACTS () Get the number of App data structures AWSTGETNUMAPPDATA () Get the App data bound of the WF AWSTGETAPPDATA () Get the moment specific App Data of the WF AWSTGETAPPDATAFIELDATTRIBUTES () |
| Get Available Business Processes | Get the Number of Available BPs for specified identity |

TABLE 2-continued

| STF Transaction (Transaction Keyword) | AWS APIs called by STF Processor and their purposes |
|---|---|
| (GetAvailableBPs) | AWSTNUMAVAILABLEBP () Get the Available BPs for specified identity AWSTAVAILABLEBP () |
| Get the Workflows where action is pending) (GetPendingActions) | Query for the number of Pending WFs AWSTNUMQUERYWF () Get the Pending WFs AWSTQUERYWF () |
| Notification generated by Workflow Processor (ReturnWFStatus) | Poll STFQ for Notifications AWSTPOLLSTFQUEUE () Get the status and dates of the WF AWSTSTATUS () Get the number of available acts AWSTNUMAVAILABLEACTS () Get the available acts AWSTAVAILABLEACTS () Get the number of App data structures AWSTGETNUMAPPDATA () Get the App data bound of the WF AWSTGETAPPDATA () Get the moment specific App Data of the WF AWSTGETAPPDATAFIELDATTRIBUTES () |

In the case of a message type of interface, both the STF processor and the Workflow Enabled Application (WEA) read (write) messages from (into) predefined message queues (i.e., directories). Similarly, in a database type of interface they read/write records of a shared database. The STF processor is constantly servicing requests from a WEA. The interface of STF processor with the WEA and the server in both these cases is asynchronous. However, in the case of a IPC based interface, the interaction between WEA and the STF processor is synchronous.

Each type of STF processor is a separate executable (EXE). When installing the STF processor, its ID (name) is registered in the server via the workflow server manager module.

Figure 3:
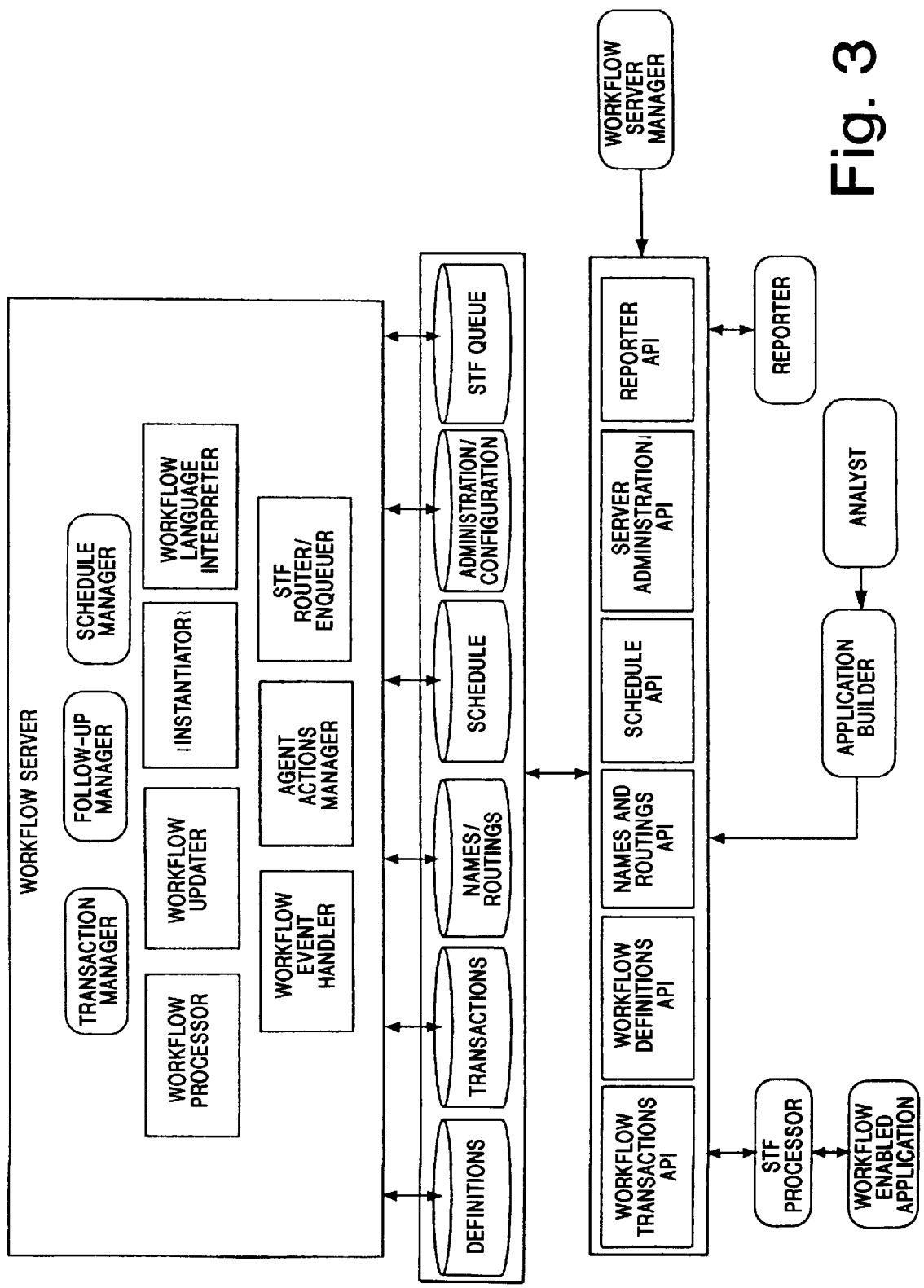
FIG. 3 is a block overview diagram of a complete workflow system including STF processors.

To provide the necessary functionality, an STF processor deals with these different requirements through creation of a base Transporter class. Three subclasses are derived from the Transporter for: Msg, Database, and IPC. From Msg, further subclasses can be derived for the various messaging platforms supported, such as MHS, VIM or MAPI. From Database, a subclass such as for SQL can be derived. From IPC, subclasses can be derived for environments such as APPC. FIG. 3 shows the interrelation of these classes in the cases of incoming and outgoing transactions.

STF Transaction Definitions
InitBP
This transaction is used to initialize a business process and the primary workflow associated with the business process. To initialize a business process, InitBP needs the following parameters:
minimal transaction parameters:
   STF Transaction ID
   Business Process Name
   Identity
extended set parameters:
   Customer Name
   Performer Name
   CompletionDate
   Response Date
   Initiate Date
   Organization Roles to Identity mappings for the business process as well as the primary workflow.
   BoundData The STF processor makes the workflow server API call to initiate the business process and primary workflow. The workflow name of the primary workflow need not be provided by the WEA. Both the Business Process Transaction ID and the workflow name (of the primary workflow) are returned to the WEA by the STF processor. If there was an error, it is returned to the WEA.

InitWF
This transaction is used to initialize a workflow (other than the primary workflow). InitWF needs the following parameters:
minimal transaction parameters:
   STF Transaction ID
   Business Process Transaction ID
   Workflow name
   Identity
extended set parameters:
   Customer Name
   Performer Name
   Completion Date
   Reply Date
   Organization Roles to Identity mapping for the workflow
   BoundData Act
This transaction specifies an Act to take in a workflow in a business process. In the case of the Act Transaction, the following parameters need to be passed:
minimal transaction parameters:
   STF Transaction ID
   Business Process Transaction ID
   Workflow Name
   Act to take
   Identity
extended set parameters:
   Completion Date
   Reply Date
   BoundData If the Completion and Reply dates are not specified then the default values for that workflow are assumed by the server. If there is any process data that the WEA needs to bind to the business process or workflow instance then the name, type and value of the bound data can also be passed along with the Act transaction. The Act Transaction returns whether the Act transaction has been logged successfully in the Transaction database or not.

Bind Data
This transaction is to bind data to a workflow or a business process. In the case of the Bind data Transaction the following parameters need to be passed:
minimal transaction parameters:
   STF Transaction ID
   Business Process Transaction ID
   Identity
   Data to be bound to the business process or workflow instance.
extended set parameters:
   Workflow Name The Bind Data Transaction returns status as to whether the application data has been bound to the business process or workflow instance successfully or not.

Get Workflow Status

This transaction is used to retrieve information related to a workflow instance. This information includes:
  WEA data bound to the workflow instance.
  List of bound data field names and attributes, when requested.
  The status of the workflow instance.
  The acts available in the workflow for the role of the specified identity.
  The Get Workflow Status Transaction needs the following parameters to be passed:
minimal transaction parameters:
  STF Transaction ID
  Business Process Transaction ID
  Workflow Name
  Identity
  Workflow Role of the Identity
extended set parameters:
  Act or State Flag(Act or State) for bound data
  Act or State value for bound data
  Return Bound Data Flag(YES or NO)
  If the extended parameter, Bound Data (Boolean) is not specified then its default value is YES and bound data fields and attributes are returned to WEA.
The Get Workflow Status Transaction returns the following:
  Bound Data
  Status String
  Completion and Reply dates
  List of available acts for the Identity
  WF status for Act or State Get Pending Actions This transaction is used to retrieve information about workflows for an Identity having an Organization Role from the set of instantiated business processes with the specified business process name, which fall into the specified time slot between the start date and end date. This information includes, for each workflow, BP Name and ID, Workflow Name and ID, Customer ID, Performer ID, Completion and Reply Dates, Status and form name. Essentially, it is the list of workflows where an action is pending.

The Get Pending Actions Transaction needs the following parameters to be passed:
minimal transaction parameters:
  STF Transaction ID
  Identity
  Workflow Role of the Identity
extended set parameters:
  Organization Role
  Business Process Name
  Start Date
  End Date If Organization Role is absent, then information about workflows for the Identity in all valid Organization Roles from the set of instantiated business processes with the specified business process name is returned. If Business Process name is absent, then information about workflows for the Identity in all valid Organization Roles from the complete set of instantiated business processes is returned. If the Start Date and End Date are absent then the time slot for the required information will span the entire database.

This transaction returns a list of workflows which includes:
  Business Process Name
  Business Process ID
  Workflow Name
  Customer Name
  Performer Name
  Completion Date
  Reply Dates
  Status string Get Available Business Processes This transaction is used to get the list of business processes that the specified Identity with a specific Organization role can initiate. The Get Available Business Processes Transaction needs the following parameters to be passed:
minimal transaction parameters:
  STF Transaction ID
  Identity
extended set parameters:
  Business Process Status(Active or Inactive)
  This transaction returns a list of business processes available for the Identity.

ReturnWFStatus

This transaction is generated by the workflow processor whenever workflow participants need to be informed about the workflow status. The STF processor polls the workflow processor continuously for any of the Notification events. If it finds one, it calls the Server APIs to get the workflow status (exactly similar to the GetWFStatus Transaction) and send all the workflow information to the participant.

This transaction is generated by the workflow processor and hence requires no parameters from the WEA.

The ReturnWFStatus Transaction returns the following:
  Notification string
  Notification Event
  Status String
  Completion and Reply dates
  List of available acts for the participant
  Bound Data STF Transaction Representation in a Messaging Environment The following describes the STF transaction representation in a messaging environment. The STF transaction travels as an attachment to the message. In a messaging environment, an STF transaction has the following format.
SIGNATURE
WORKFLOW DATA
The signature and addressing information, together constitute the STF Transaction Envelope.

Signature

Each STF Transaction starts with the Signature. It could be a line containing the following:
STFMHS-01

Workflow Data

This includes the STF type, STF instance, workflow participants, workflow type, transaction type, start date, expected and/or requested dates and completion dates, workflow status etc.

STF Keyword Format

The STF keyword format in a messaging environment consists of four fields in the following format.
<Keyword (field name)><delimiter><Field value><terminator>

Keyword (field name)

See Table 3 below.

Delimiter

The delimiter is a character such as a ":" used to separate the field name and the field value.

Field value

The syntax and semantics of the field value varies and will depend on the field. The following fields have a specific format in which data is to be sent.

Sent by WEA to STF Processor
  Date
  OrgRole to Identity
  BoundData
Sent by STF Processor to WEA
  Acts
  Status
  BoundData
  Business Process List
  Workflow List
Terminator The terminator consists of the carriage return—line feed pair <CR><LF>.

A sample STF transaction in a messaging environment would be as follows:

TABLE 3

| SIGNATURE | STFMHS-01 |
|---|---|
| WORKFLOW DATA | STFTYPE:GetWFStatus<br>STFID:10002<br>WFNAME:PrintPaySlips<br>BPID:10202<br>IDENTITY:Mani-ID<br>ACTORSTATE:Act<br>ACTSTATE:Request |

STF Transaction Keyword Data Formats

The following describes the STF transaction keyword data formats which are medium independent.

| STF Keyword | Description, Data Type, Format and Valid Values |
|---|---|
| ACT | Description: Act to be taken<br>Data type and format: string of up to 64 characters<br>Valid values:<br>Request, Offer, Accept_CounterOffer, Accept_Offer, Agree, Cancel, Counter, CounterOffer, Counter_with_request, Declare_Completion, Declare_Dissatisfaction, Declare_Satisfaction, Decline_Request, Decline_Offer, Decline_CounterOffer, Revoke |
| ACTS | Description: List of Acts with their canonical and English names<br>Data type and format:<br>Canonical name of Act, English Name of the act, . . .<br>Where<br>Canonical Name of the Act - String of up to 64 characters<br>English Name of the Act - String of up to 64 characters |
| ACTORSTATE | Description: Act or State flag for which workflow status has been requested<br>Data type and format: String<br>Valid values:<br>Act, State. Default is Act |
| ACTSTATE | Description: Act or State value<br>Data type and format: String<br>Valid values for Act:<br>Request_Offer, Accept_CounterOffer, Accept, Offer, Agree, Cancel, Counter, CounterOffer, Counter_with_request, Declare_Completion, Declare_Dissatisfaction, Declare_Satisfaction, Decline_Request, Decline_Offer, Decline_CounterOffer, or Revoke<br>Valid values for State:<br>Inactive, Initial, Request, Offer, Recounter, OCounter, Agreement, Completion, Satisfaction, Cancel, Decline, or Revoke |
| BOUNDDATA | Description: Application data associated with a workflow<br>Data type and format: Bounddata format to be sent by WEA to STF Processor:<br>BDfieldName, BDfieldValue; BDfieldName, BDfieldValue<br>where,<br>BDFieldName - string of up to 64 characters<br>BDfieldValue - string of up to 255 characters. |

-continued

| | |
|---|---|
| | Each bounddata field is separated by comma and items are separated by semicolons. The last item need not contain a semicolon. All the fields in BoundData are mandatory and no blank values are allowed.<br>Data type and format: Bounddata format to be sent by STF Processor to WEA<br>BDfieldName, BDfieldValue, AttributeFlag; where,<br>BDFieldName - string of up to 64 characters<br>BDfieldValue - string of up to 255 characters.<br>AttributeFlag - string of 2 digits specifying Attribute<br>Attribute Flag Values<br>0 - Read Only<br>1 - Hidden<br>2 - MustFill<br>3 - Editable<br>4 - Reserved<br>5 - Reserved |
| BPTID | Description: Business Process Transaction ID returned by workflow server and is subsequently used by WEA for queries.<br>Data type and format: String of up to 64 characters |
| BPLIST | Description: Business Process list sent by Workflow Processor<br>Data type and format: list of Business process names and IDs<br>BPNAME; BPTID, BPNAME, BPTID, . . .<br>where<br>BPNAME_Business Process Name of String up to 64 characters<br>BPTID - Business Process Transaction ID of String up to 64 characters |
| BPNAME | Description: Business Process Name<br>Data type and format: String of up to 64 characters |
| BPSTATUS | Description: Business Process status required (active or inactive)<br>Data type and format: String<br>Valid values:<br>Active, or Inactive |
| CDTIME | Description: Customer request completion date and time<br>Data type and format: Date formats<br>1. mm dd-yyyy HH:MM:SS<br>2. MMM dd yyyy HH:MM:SS<br>3. MMMMMMMM dd yyyy HH:MM:SS<br>where<br>mm - Month (01–12)<br>MMM - Month (Jan–Dec)<br>MMMMMMMM - - Month Name (January – December)<br>dd - Day (0–31)<br>yyyy - Year (1970–200x)<br>HH - Hour (0–23)<br>MM - Minute (0–59)<br>SS - Second (0–59) This is optional<br>All the fields in the date and time are mandatory except the seconds field The delimiters separating date fields can be blank, hyphen, forward slash, or dot (.).<br>Examples of Date and Time for November the 20th 1992 at 10 am can be specified as:<br>November-20-1992 10:00,<br>Nov-20-1992 10:00:00, or<br>11-20-1993 10:00 |
| COMMENT | Description: Comment associated with an STF Transaction<br>Data type and format: String of up to 255 characters |
| CUSTOMERID | Description: Workflow customer Name<br>Data type and format: Customer name. |

-continued

| | |
|---|---|
| ENDDTIME | String of up to 64 characters<br>Description: End of date and time range for Get Pending Action<br>Data type and format: Date format (as in CDTIME) |
| ERROR | Description: Error code returned by Workflow Processor to an STF Transaction<br>Data type and format: String of digits up to 8 characters |
| ERRORMSG | Description: Error message corresponding to ERROR<br>Data type and format: String of up to 1024 characters |
| FORMID | Description: ID for form in WF definition, returned as part of Bound Data<br>Data type and format: String of up to 64 characters |
| IDENTITY | Description: Identity who is participant in the Workflow<br>Data type and format: String of up to 64 characters |
| IDTIME | Description: Initiate time of a Business Process or Workflow<br>Data type and format: Date format (as in CDTIME) |
| NOTIFICATION | Description: Notification string returned by Workflow Processor to WEA<br>Data type and format: String of up to 255 characters specifying the Notification string<br>Possible strings are<br>Performer response past due, Performer completion past due, Performer completion coming due, Customer Response past due, Act taken. |
| NOTIFICTYPE | Description: Notification Type returned by the Workflow Processor to the WEA<br>Data type and format: String of 1 digit<br>Notification event types<br>0 - Follow Up<br>1 - Follow Up<br>2 - Reminder<br>3 - Follow Up<br>4 - Act |
| OBSERVERID | Description: Name of observer in workflow<br>Data type and format: String of up to 64 characters |
| ORG2IDENTITY | Description: Organizational Role to Identity Mapping for the workflow<br>Data type and format: Organization roles and identities list<br>ORGROLE=IDENTITY;ORGROLE=IDENTITY; . . .<br>where<br>ORGROLE - String of up to 64 characters<br>IDENTITY - String of up to 64 characters<br>All the fields in ORG2IDENTITY are mandatory and no blank values are allowed. |
| ORGROLE | Description: Organizational Role of the Identity<br>Data type and format: String of up to 64 characters |
| PENDINGACTIONS | Description: List of Workflows where some act is pending<br>Data type and format: List of Workflows where actions are pending<br>BPNAME, BPTId, WFNAME, CUSTOMER, PERFORMER, COMPLETIONDATE, REPLYDATE, STATUS; . . .<br>where<br>BPNAME - Business Process Name of String up to 64 characters<br>BPTId - Business Process Transaction ID of String up to 64 characters<br>WFNAME - Workflow Name of String up to 64 characters<br>CUSTOMER - Customer Name of String up to 64 characters |

|  | PERFORMER - Performer Name of String up to 64 characters |
|---|---|
|  | COMPLETIONDATE - Completion Date (as inCDTIME) |
|  | REPLYDATE - Reply Date (as in CDTIME) |
|  | STATUS - Status string |
| PERFORMERID | Description: Name of Performer in the Workflow |
|  | Data type and format: Performer Name. String of up to 64 characters |
| RDTIME | Description: Date and Time by which a participant asks for a response to his act. |
|  | Data type and format: Date format (as in CDTIME) |
| RTNBOUNDDATA | Description: Flag indicating whether to return application data to WEA |
|  | Data type and format: String |
|  | Valid values: |
|  | Yes, No. Other than 'No' will be taken as 'Yes' and Default is Yes |
| RTNSTATUS | Description: Flag indicating whether to return status to WEA |
|  | Data type and format: String |
|  | Valid values: |
|  | Yes, No. Other than 'No' will be taken as 'Yes' and Default is Yes |
| STARTDTIME | Description: Start date for Pending Actions |
|  | Data type and format: Date format (as in CDTIME) |
| STATUS | Description: Status of Workflow |
|  | Data type and format: Workflow status string format |
|  | WFStatus, Completion Date1, Reply Date1, Completion Date2, Reply Date2 |
|  | WFStatus - A string of up to 64 characters containing the WF status string |
|  | Possible values are, |
|  | Inactive, Initial, Request, Offer, Recounter, Counter, Agreement, Completion, Satisfaction, Cancel, Decline, or Revoke |
|  | Completion date1 - Completion requested by Customer (Completion due for Performer) with format as in CDTIME |
|  | Reply Date1 - Reply due to Performer from Customer (Reply due to customer from Performer) with format as in CDTIME |
|  | Completion Date2 - Completion due by Performer (Completion requested by Customer from Performer) with format as in CDTIME |
|  | Reply Date2 - Reply due by Performer to Customer (Reply due by Customer from Performer) with format as in CDTIME |
| STFID | Description: STF Transaction ID specified by WEA |
|  | Data type and format: String of up to 255 characters |
| STFTYPE | Description: STF Transaction Type |
|  | Data type and format: String of up to 64 characters |
| STFVER | Description: STF Transaction Version |
|  | Data type and format: String of up to 64 characters |
| WFNAME | Description: Workflow Name |
|  | Data type and format: String of up to 64 characters |

-continued

| | |
|---|---|
| WFROLE | Description: Identity's role in workflow<br>Data type and format: String of up to 64 characters<br>Valid Values:<br>Customer, Performer, Observer |

Transaction types (STFTYPE)

| Type | Identifier |
|---|---|
| InitBP | INITBP |
| InitWF | INITWF |
| Act | ACT |
| Bind Data | BINDDATA |
| Get Workflow Status | GETWFSTATUS |
| Get Available Business Processes | GETAVAILBPROCS |
| Get Pending Actions | GETPENDINGACTIONS |
| Return WF Status | RETWFSTATUS |

The STF transaction is placed in an attachment file. This file needs to be specified in the attachment IPM Header. An STF processor makes use of the following SMF headers from the MHS Message to retrieve addressing information for the STF Transaction. Other header information is ignored by the STF Processor.

From
To
Attachment

The following are the complete STF transactions as received by a STF processor from a WEA via MHS. It also illustrates the STF Transaction sent by STF Processor in reply to the WEA via MHS.

Example of MHS message header file received (from WEA) by STF Processor through MHS

| MHS Message |
|---|
| SMF-70<br>001From: Mani@Host2<br>001To: STFPROC1@Host1<br>200Attachment: FILE1.STF<br>... (other info put by MHS, but ignored by STF Processor) |

Example of MHS message header created by the STF Processor in response to the above header file (To WEA)

| |
|---|
| SMF Message<br>SMF-70<br>001From: STFPROC1@Hos1<br>001To: Mani@Host2<br>200Attachment: STF00000<br>InitBP<br>Attachment file containing InitBP Transaction<br><br>COMMENT: This is an example of InitBP<br>STFVER:STFMHS-01<br>STFTYPE:InitBP<br>BPNAME:STAFFPAYROLL<br>IDENTITY:Mani-ID<br>STFID:10401<br>CUSTOMERID:Lakshman-ID<br>PERFORMERID:Manoj-ID<br>CDTIME:01-02-1993 17:00<br>RDTIME:01-02-1993 09:00<br>IDTIME:01-02-1993 17:00 |

-continued

| |
|---|
| ORG2IDENTITY:Mani-ID=Ac.Officer;Ted-ID=Ac.Mgr<br>BOUNDDATA:GR8-BAS,40.00;EMPNAME,Bhat<br>RTNSTATUS:YES |

The corresponding workflow server API Calls would be:
AWSTBeginTransaction()
AWSTInitBP();
AWSTBindAppData();
AWSTEndTransaction()

The values returned by the workflow server APIs will be sent to the WEA as Return Status transaction (if WEA had set RTNSTATUS to YES. By default, STF Processor assumes RTNSTATUS as YES). ERROR keyword is set to 0 if there was no error processing the Transaction. Otherwise ERROR will be set to a value and the error message corresponding to the ERROR will be sent in ERRORMSG.

| |
|---|
| Attachment file containing ReturnStatus to InitBP Transaction: |
| STFTYPE:ReturnStatus<br>STFID:10401<br>BPID:10000<br>WFNAME:FixBugs<br>ERROR:00000000<br>ERRORMSG:Transaction with workflow server is successful |

Suppose that an error occurred in the InitBP Transaction that BPNAME keyword was not found, then the values returned by the workflow server APIs will be sent to the WEA as Return Status transaction (if WEA had set RTNSTATUS to YES. By default, STF Processor assumes RTNSTATUS as YES).

| |
|---|
| Attachment file containing ReturnStatus to InitBP Transaction for Error: |
| STFTYPE:ReturnStatus<br>STFID:10401<br>ERROR:00000197<br>ERRORMSG:Could not find keyword(s): |

-continued

```
BPNAME.
InitWF
Attachment file containing InitWF Transaction

STFVER:STFMHS-01
STFTYPE:InitWF
STFID:10402
BPID:10000
WFNAME:PrintPaySlips
IDENTITY:Mani-ID
CUSTOMERID:Lakshman-ID
PERFORMERID:Manoj-ID
CDTIME:02-01-1993 17:00
RDTIME:Feb-01-1993 17:00
IDTIME:February-01-1993 10:00
ORG2IDENTITY:Manoj-ID=Pgmr;Lakshman-ID=Analyst
RTNSTATUS:YES
```

The corresponding workflow server API calls would be:
AWSTBeginTransaction()
AWSTInitWF();
AWSTBindAppData();
AWSTEndTransaction()

The values returned by the workflow server APIs will be sent to the WEA as Return Status transaction (if WEA had set RTNSTATUS to YES. By default, STF Processor assumes RTNSTATUS as YES).

```
Attachment file containing ReturnStatus to InitWF Transaction

STFTYPE:ReturnStatus
STFID:10401
ERROR:00000000
ERRORMSG:Transaction with workflow
server is successful
Act
Attachment file containing Act Transaction STFVER:STFMHS-01
STFTYPE:Act
BPID:10000
STFID:10403
WFNAME:PrintPaySlips
ACT:Agree
IDENTITY:Mani-ID
CDTIME:02-01-1993 17:00
RDTIME:02-01-1993 17:00
BOUNDDATA:GR8-BASIC, 3000.00; GR7-BASIC, 3500.00
RTNSTATUS:YES
```

The corresponding workflow server API calls would be:
AWSTBeginTransaction()
AWSTActInWF();
AWSTActStatusQuery();
AWSTBindAppData();
AWSTEndTransaction()

The values returned by the workflow server APIs will be sent to the WEA as Return Status transaction (if WEA had set RTNSTATUS to YES. By default, STF Processor assumes RTNSTATUS as YES).

```
Attachment file containing ReturnStatus to Act Transaction

STFTYPE:ReturnStatus
STFID:10403
ERROR:00000000
ERRORMSG:Transaction with workflow
```

-continued

```
server is successful
Bind Data
Attachment file containing Bind Data Transaction STFVER:STFMHS-01
STFTYPE:BindData
BPID:10000
STFID:10407
WFNAME:PrintPaySlips
IDENTITY:Mani-ID
RTNSTATUS:YES
BOUNDDATA:GR8-BASIC, 3000.00; GR7-BASIC, 3500.00;
GRG-BASIC, 4000.00;PAYDATE, 02-01-1993 17:00
```

The corresponding workflow server API call for the Bind Data Transaction would be:
AWSTBeginTransaction()
AWSTBindAppData();
AWSTEndTransaction()

The values returned by the workflow server APIs will be sent to the WEA as Return Status transaction (if WEA had set RTNSTATUS to YES. By default, STF Processor assumes RTNSTATUS as YES).

```
Attachment file containing ReturnStatus to Bind Data
Transaction

STFTYPE:ReturnStatus
STFID:10407
ERROR:00000000
ERRORMSG:Transaction with workflow
server is successful
Get Workflow Status
Attachment file containing Get Workflow Status Transaction STFVER:STFMHS-01
TIME:Sep-24-1992 10:40
STFTYPE:GetWFStatus
BPID:100000
WFNAME:PrintPaySlips
STFID:10404
WFROLE Customer
IDENTITY:Mani-ID
RTNSTATUS:YES
RTNBOUNDDATA:YES
ACTORSTATE:Act
ACTSTATE:Agree
```

Since this transaction is used to retrieve all information related to a workflow instance, it maps to several workflow server APIs The corresponding workflow server API Calls would be:
AWSTStatus();
AWSTAvailableActs();
AWSTGetAppData();

The values returned by the workflow server APIs will be sent to the WEA as Return Status transaction (if WEA had set RTNSTATUS to YES. By default, STF Processor assumes RTNSTATUS as YES). If RTNBOUNDDATA is set to YES, then BoundData is returned to the WEA. The Bound Data attribute sent by workflow server is the "moment" attribute flag of a workflow if the Bound data is required for a state.

Attachment file containing ReturnStatus to Get Workflow
Status Transaction

-continued

```
STFTYPE: ReturnStatus
STFID: 10404
STATUS: Completed, 02-01-1993 17:00, 02-01-1993
17:00, 02-01-1993 17:00; 02-01-1993 17:00
ACTS: Agree, PrintSlips
FORMID: SAMPLEFORM
BOUNDDATA: GR8-BASIC, 3000.00, 01; GR7-BASIC,
3500.00, 01; GR6-BASIC, 4000.00, 01
ERROR: 00000000
ERRORMSG: Transaction with workflow server is
successful
```

Note: STATUS and ACTS keyword format
STATUS: WFStatus, Completion Date1, Reply Date1, Completion Date2, Reply Date2
where,

| | |
|---|---|
| WFStatus string | Workflow status string (Inactive, Initial, Request, Offer, Recounter, Counter, Agreement, Completion, Satisfaction, Cancel, Decline, or Revoke) |
| Completion Date1 | Completion requested by Customer (Completion due for Performer) |
| Reply Date1 | Reply due to Performer from Customer (Reply due to customer from Performer) |
| Completion Date2 | Completion due by Performer (Completion requested by Customer from Performer) |
| Reply Date2 | Reply due by Performer from Customer (Reply due by Customer from Performer) |

ACTS: Act Type, Act Name
where,

| | |
|---|---|
| Act Type string | Act Type string (Request, Offer, Accept_CounterOffer, Accept_Offer, Agree, Cancel, Counter, CounterOffer, Counter_with_request, Declare_Completion, Declare_Dissatisfaction, Declare_satisfaction, Decline_Request, Decline_Offer, Decline_CounterOffer, Revoke, or Null) |
| Act Name | Act Name string. |

Get Available Business Processes
Attachment file containing Get Available Business Processes Transaction

```
STFVER: STFMHS-01
STFTYPE: GetAvailableBPs
STFID: 10405
IDENTITY: Mani-ID
BPSTATUS: Active
```

The Get Available Business Processes returns the list of Business Processes that the identity (in the specific role) can initiate. The BPSTATUS is an optional parameter which specifies whether active or inactive (all) BPs are required by the WEA.
The corresponding workflow server API Call would be: AWSTAvailableBP();
The values returned by the workflow server APIs will be sent to the WEA as Return Status transaction (if WEA had set RTNSTATUS to YES. By default, STF Processor assumes RTNSTATUS as YES)

Attachment file containing ReturnStatus to Get Available BPs Transaction

```
STFTYPE:ReturnStatus
STFID:10405
```

-continued

```
BPLIST:BugReportingSystem, 1000;
BugReportingSystem, 10001
ERROR:00000000
ERRORMSG:Transaction with workflow server is
successful
```

Get Pending Actions
Attachment file containing Get Pending Actions Transaction

```
STFVER:STFMHS-01
STFID:10406
STFTYPE:GetPendingActions
WFROLE:Performer
ORGROLE:Ac. Officer
BPNAME:STAFFPAYROLL
IDENTITY:Mani-ID
STARTDTIME:02-01-1993 17:00
ENDDTIME:02-01-1993 17:00
RTNSTATUS:YES
```

The Get Pending Actions returns information about the workflows for the specified identity (having the specific Organization role) from the set of instantiated business processes with the specified Business Process name.
The corresponding workflow server API Call would be:
AWSTQueryWF();
The values returned by the workflow server APIs will be sent to the WEA as Return Status transaction (if WEA had set RTNSTATUS to YES. By default, STF Processor assumes RTNSTATUS as YES)

Attachment file containing ReturnStatus to Get Pending Actions Transaction

```
STFTYPE:ReturnStatus
STFID:10405
PENDINGACTIONS:WFNAME1;WFNAME2
ERROR:00000000
ERRORMSG:Transaction with workflow server is
successful
ReturnWFStatus
Attachment file containing ReturnWFStatus Transaction None
```

This Transaction is generated by the Workflow Processor whenever the Workflow participants are needed to be informed about the Workflow status. The STF Processor will poll the Workflow Processor continuously for any of the Notification events. If it finds one, it calls the Server APIs to get the Workflow Status (exactly similar to the GetWFStatus Transaction) and send all the workflow information to the participant.
The corresponding workflow server API Calls would be:
AWSTBeginTransaction()
AWSPollSTFQueue()
AWSTStatus();
AWSTAvailableActs();
AWSTGetAppData();
AWSTEndTransaction()

The values returned by the workflow server APIs will be sent to the WEA as Notification transaction.

---
Attachment file containing ReturnWFStatus Transaction

STFTYPE:ReturnWFStatus
NOTIFICATION:Performer Response Past Due
NOTIFICTYPE:1
STATUS:Completed,02-01-1993 17:00,02-01-1993 17:00,02-01-1993 17:00,02-01-1993 17:00
ACTS:Agree, PrintSlips
FORMID:SAMPLEFORM
BOUNDDATA:GR8-BASIC, 3000.00,01; GR7-BASIC, 3500.00,01; GR6-BASIC, 4000.00,01

---

STF Transaction Representation in a Database Environment

In the case of a shared database environment, the STF transaction format is a set of tables.

Each table has a record structure as follows:

| Table Name | Description |
| --- | --- |
| Act | Data required Act |
| Acts | List of canonical acts and their English names |
| BindData | Binding Application specific Data to Workflow |
| BoundData | Application specific Bound Data |
| BusinessProcessList | List of Available Business Processes |
| Error | Error information returned by STF Processor to the WEA |
| GetAvailableBPs | Get Available Transactions |
| GetPendingActs | Get Pending Actions Transaction |
| GetWFStatus | Get Workflow Status Transaction |
| InitBP | Initialize Business Process Transaction |
| InitWF | Initialize Workflow Transaction |
| Org2Identity | Organizational Role to Identity Mapping |
| PendingActions | List of Workflows where some act is pending |
| ReturnWFStatus | Return Workflow Status (Notification) Transaction |
| WorkflowStatus | Workflow Status data returned by GetWFStatus and ReturnWFStatus |

Each table consists of a set of columns in a relational table. The first field in the table is the Transaction ID which is the primary key for the table—its value can never be void. Other fields may contain void values depending upon whether those fields are of the minimal set or the extended set of parameters of the respective STF transaction.

An alternative implementation of the STF transaction representation in a database environment would consist of three tables as follows:

| Keyword Index Table | |
| --- | --- |
| STF Keyword | Index |
| ACT | 1 |
| ACTS | 2 |
| ACTORSTATE | 3 |
| . | . |
| . | . |
| . | . |

| Incoming Transactions | | |
| --- | --- | --- |
| STF Trans ID | Keyword | Value |

| Outgoing Transactions | | |
| --- | --- | --- |
| STF Trans ID | Keyword | Value | where the STF Trans ID column contains STF transaction identification, the keyword column contains a keyword index corresponding to the keyword index table; and the value column contains one of the valid values from the STF Transaction Keyword Data Formats table.

STF Transaction Representation in an Inter-Process Communication Environment

The STF transaction in an IPC environment is represented by a set of parameters in a remote procedure call, in a manner similar to the parameters of a workflow API call as described in U.S application Ser. No. 08/014,796 filed Feb. 8, 1993.

STF Processors

The following is a description of the three types of STF processors needed for messaging, shared database and inter-process communication. Details for the messaging type are explained by way of an example using MHS and VIM. Details needed for the shared database type by way of examples using SQL. Details for the inter-process communication type should be apparent to persons skilled in the art from this description.

In the preferred embodiment as set forth below, the invented system is implemented using the Model, View, Class (MVC) paradigm of object oriented programming.

Transporter Module

The transporter module of an STF processor handles the reception of inputs arriving via messaging, shared database or IPC and the preparation of outputs via messaging, shared database or IPC. The transporter recognizes, reads and writes entire transactions. The transporter accesses all items of bound data or transaction data via keyword entries. Client input/output content is required to be formatted as keyword, value(s), flags for each item of a transaction or bound data.

The transporter class provides basic interaction with the WEA software. In the case of MHS, for example, the transporter class provides the messaging interface. It gets and puts messages and passes them to the TxParser, which is a class that understands and reads the MHS message and extracts from it the STF transaction. The transporter also receives the message from the TxFormatter which is a class that constructs the message in MHS format. When a developer creates a new STF processor, it is necessary to derive from the subclasses of the transporter class an interface to the required transport medium to the STF processor.

The TxProcessor and STF_Transaction (STF_Tx) classes form the core of the STF processor. The TxProcessor is the controlling class that keeps track of transactions queued up to be done. The STF_Tx creates all the objects which between them contain all the methods necessary to interface to the workflow server.

Since the STF processor converts a WEA-formatted transaction into a workflow server-formatted transaction, the transaction classes center the conversion process and provide methods to both sides of the conversion.

Transaction Processor

Figure 6:
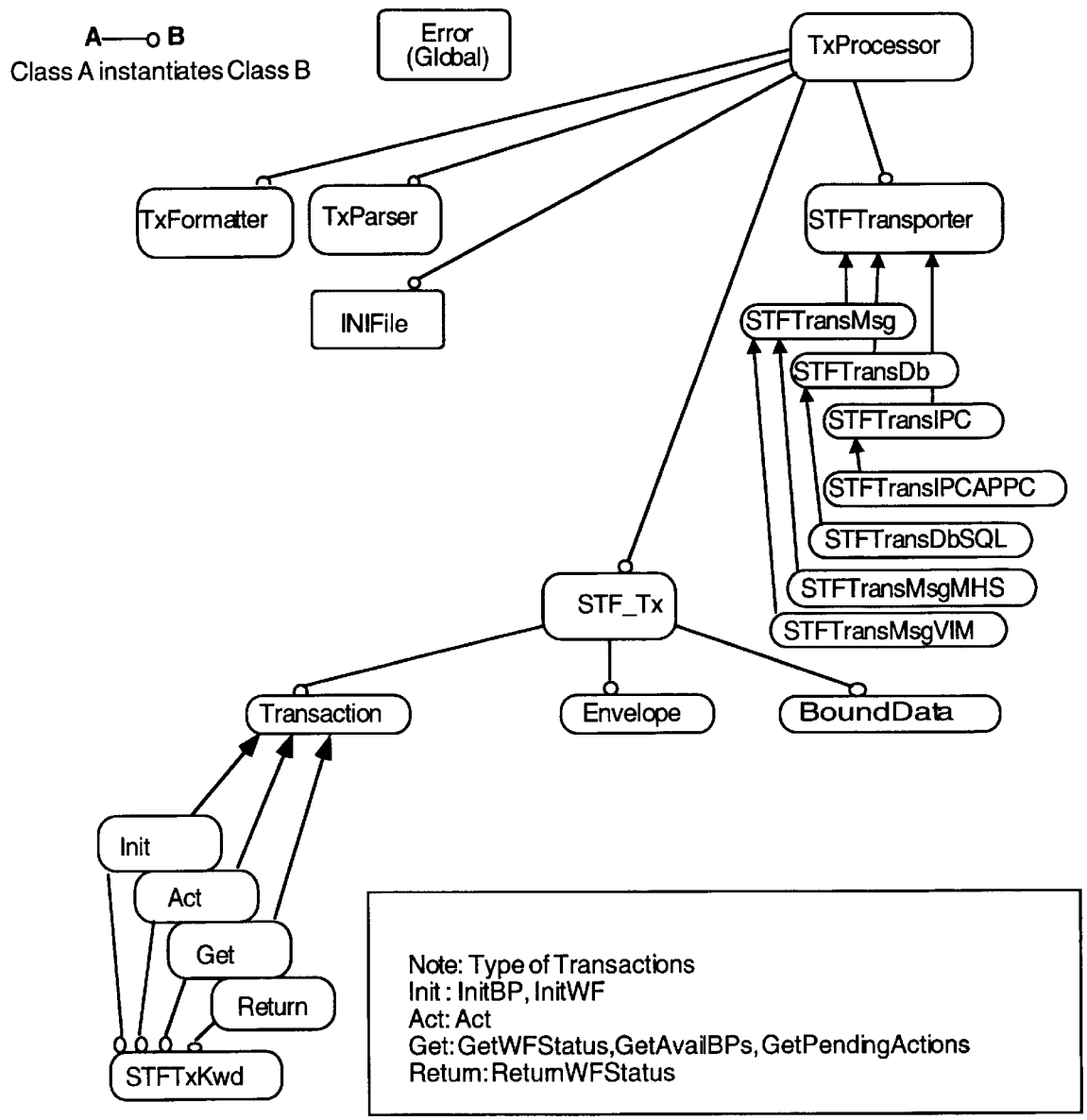
FIG. 6 is a generic class hierarchy diagram of a STF processor showing how the classes in STF processors are linked.
Figure 7:
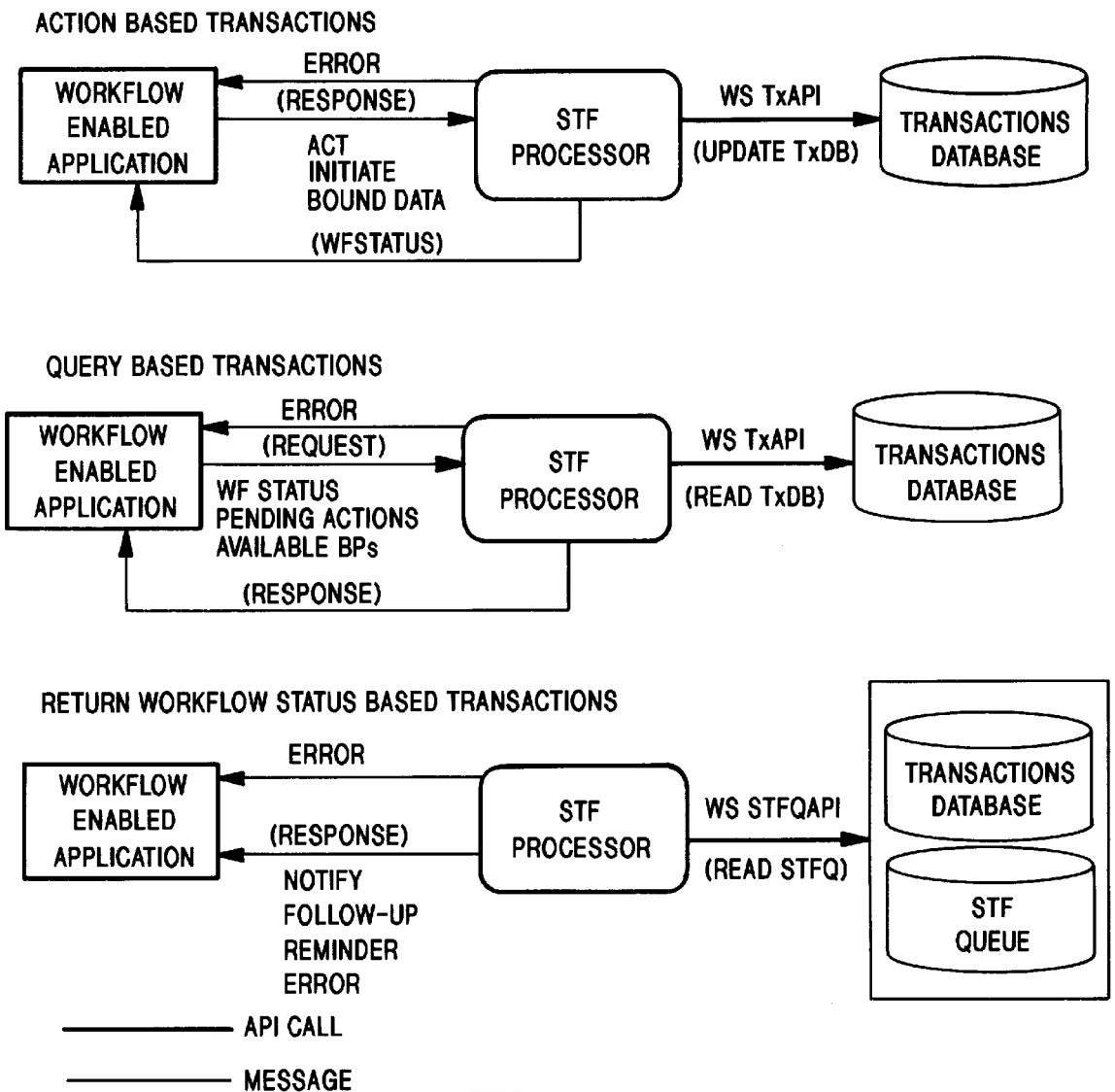
FIG. 7 shows the interaction of workflow enabled application, STF processor and workflow server for different kinds of transactions.

The TxProcessor is the central controller class in STF Processor. It has pointers to Error, INIFile, Transporter, TxParser, TxFormatter and STF_Tx base classes in the STF Processor. FIG. 6 illustrates the generic class hierarchy diagram of a STF processor and how the classes in STF processors are linked.

TxProcessor has methods to process input and output transactions. The TxProcessor constructor instantiates TransMsgMHS (for a messaging environment based on MHS), TxParser and TxFormatter.

Within the TxProcessor method, to process input Transactions, a parser method to get input from Transporter is called which loads the input transaction.

Next, STF_Tx is instantiated in inbound or outbound mode depending upon TXProcessor method for processing input or output Transactions.

Pointers to Transporter, TxParser and TxFormatter are passed on to STF_Tx private data members through the constructor. The STF_Tx constructor then gets the Transaction Type by calling parser method for processing inbound Transactions or calls a method for polling STFQ for processing outbound Transactions.

Depending upon the Transaction Type appropriate transaction objects are instantiated which in turn process the Bound data, Envelope data and call appropriate workflow server APIs.

The return status of the workflow server API's is handled by creating a return Transaction which is internally passed over to TxFormatter for onward delivery to Transporter. Cleanup operation is done by calling TxProcessor's methods to do the same. This completes one inbound or outbound transaction processing All the output transactions are processed. If there are no output transactions pending, a message is posted to process input transactions.

STF Processor Class Descriptions

Class Name: INIFile

Class Description

This is the INI file base class that handles STF Processor INI file loading. The INI file is created during STF Processor installation. STF Processor will assume a default STF.INI in the current directory. If the STF.INI is not found in the current directory, it will be searched in PATH environment variable. The INI file is similar to OS/2 INI files. The INI file will have keywords and values. Following is the content of the INI file in STF Processor Ver1.0.

| STFProcessorName: STFPROC1 |  |
|---|---|
| ErrorLogFile: C:\TEMP |  |
| Super Class |  |
| None |  |
| sub Classes |  |
| None |  |
| Classes Used |  |
| None |  |
| Attributes |  |
| Attribute Name | Attribute Description |
| szINIFilName | INI file name |
| szSTFProcID | STF Processor ID |

| | |
|---|---|
| szSTFExeFilName | STF EXE file name |
| szSTFErrFilName | Error log file name |
| Public Methods | |
| Method Name | Method Description |
| INIFile(PSZ pszINIFilName) | Constructor updates the INI file name szINIFilName |
| USHORT uFillINIData( ) | reads the INI file and fills the INI file information in the attributes |
| BOOL bParseINILine(PSZ pszLinebuf, PPSZ ppszItemNames, PSZ pszValue, USHORT *puIndex) | parses INI file line using array of INI keywords and returns value and index associated with the INI file keyword |
| PSZ pszGetINIFilName( ) | returns INI file name stored in szINIFilName |
| PSZ pszGetSTFProcID( ) | returns the STF Processor name stored in szSTFProcID |
| PSZ pszGetSTFExeFilName( ) | returns the EXE file name of STF Processor stored in szSTFExeFilName. |
| PSZ pszGetSTFErrFilName( ) | returns the error log file name stored in szSTFErrFilName. |
| PSZ pszGetSTFVariantName( ) | returns the STF variant name stored in szSTFVariantName |

Class name: STFTransporter

Class description

This is an abstract base class which is responsible for getting WEA inputs and returning responses to the WEA. It contains methods to interface with the external environment as well as provides methods for TxParser, TxFormatter and Envelope objects for reading and writing transactions and user information. The STFTransporter class contains a set of virtual methods which are overloaded by the methods of the appropriate derived classes(STFTransMsg, STFTransDb or the STFTransIPC class). In the case of messaging environment like MHS, the STFTransporter virtual methods are replaced by the methods of the STFTransMsgMHS class. STFTransporter accepts and passes an array of strings containing Transaction items, values, and flags to the TxParser.

| | |
|---|---|
| Super Class | |
| None | |
| Sub Classes | |
| STFTransMsg, for handling Messaging environment | |
| STFTransDB for handling Database environment | |
| STFTransIPC for handling IPC environment | |
| Classes Used | |
| None | |
| Attributes | |
| Attribute Name | Attribute Description |
| None | None |
| Public Methods | |
| Method Name | Method Description |
| virtual USHORT uGetInputTx(PPSZ ppszAWESTFInputTx, USHORT* uITCount, BOOL*pbMore) | A pure virtual method which will be overloaded by appropriate method of derived classes STFTransMsg, STFTranSDB, STFTransIPC. Overloaded methods get a reference to array of pointers to strings |

-continued

| | containing transaction items, values, flags from the WEA input |
|---|---|
| virtual BOOL bWriteWEAOutput(PPSZ ppszFmtOutput, USHORT uFOCount) | A pure virtual method that is overloaded by appropriate public methods of the derived classes STFTransMsg, STFTransDB, STFTransIPC. It creates the Transaction header and posts it along with the attachment file (in case of messaging environment) as output to WEA application. It returns Boolean indicating success or failure of the posting operation. This method is used by formatter to send transactions to WEA. |
| virtual BOOL bGetInUserInfo(PPSZ ppszInUserInfo, USHORT* puInUICount ) | A pure virtual method that is overloaded by methods of derived classes STFTransMsg, STFTransDB, STFTransIPC |
| virtual BOOL bPutOutUserInfo(PPSZ ppszOutUserInfo, USHORT uOutUICount) | A pure virtual method that is overloaded by appropriate methods of derived classes STFTransMsg, STFTransDB, STFTransIPC |
| virtual BOOL bDeleteTx(USHORT *uDeleteTxFlag) | A virtual method that is overloaded by appropriate methods of derived classes. The overloaded method marks inputs from WEA as read. It is called once an Input from WEA is completely processed. |

Class Name: STFTransMsg

Class Description

STFTransMsg derived class consists of a set of public methods which overload the appropriate methods of the STFTransporter class to incorporate message specific features. The STFTransMsg derived class also contains a set of protected virtual methods which are used in defining the set of the STFTransMsg public methods, i.e. in writing the code of these public methods. This set of protected virtual methods in turn is overloaded by the methods of the derived class STFTransMsgMHS in case of messaging environment based on MHS and by methods of STFTransMsgVIM derived class in the case of a messaging environment based on VIM.

Super Class
STFTransporter
Sub Classes
STFTransMsgMHS handles MHS messaging environment
STFTransMsgVIM handles VIM messaging environment
Classes Used
None
Attributes

| Attribute Name | Attribute Description |
|---|---|
| ppszInUserInfo | input user info used for storing addressing information of inbound transactions. |
| uInUserInfoCount | number of elements in ppszInUserInfo. |
| ppszOutUserInfo | Output user Info used for addressing outbound transactions. |
| uOutUserInfoCount | number of elements in ppszOutUserInfo |

-continued

Public Methods

| Method Name | Method Description |
|---|---|
| STFTransMsg( ) | Constructor used for initializing private data members of STFTransMsg class. |
| USHORT uGetInputTx(PPSZ ppszAWESTFInputTx, USHORT* uITCount, BOOL *pbMore) | This method uses protected virtual methods which are overloaded by appropriate methods of STFTransMsgMHS and STFTransMsgVIM derived classes. It gets the inbound transaction, user information and number of strings present in Input transaction and user information data structures respectively. The user information data is stored in its private data members. Various arguments are described below. 1. ppszWEASTFInputTx argument receives reference to array of pointers to strings containing transactions sent by WEA. 2. uITCount specifies count of strings in ppszWEASTFInputTx. 3 pMore flag indicates if more unread input messages are present. This flag is useful in processing multiple input transactions. |
| BOOL bWriteWEAOutput(PPSZ ppszFmtOutput, USHORT uFOCount) | This method accepts parameters for creating an outbound transaction to be sent to WEA. It accepts array of pointers to strings from which a return Transaction is formulated (In case of messaging environment it creates an attachment file) and posts the message along with formulated transaction (attachment file in Messaging environment) as WEA output. It makes use of protected virtual methods that are overloaded by the appropriate methods of STFTransMsgMHS and STFTransMsgVIM derived classes. Various arguments are given below: 1. ppszFmtOutput argument contains formatter output Transaction for onward delivery to WEA. 2. uFOCount argument specifies number of strings in ppszFmtOutput. |
| BOOL bGetInUserInfo(PPSZ ppszInUserInfo, USHORT* pInUICount) | This method gets User Information that is stored in ppszInUserInfo private data member. This is used for addressing the responses to the current transaction. The various arguments passed are given as under. 1. ppszInUserInfo argument contains Input user information for addressing purpose. 2. pInUICount points to number of strings in ppszUserInfo. |

| | |
|---|---|
| BOOL bPutOutUserInfo(PPSZ ppszOutUserInfo, USHORT uOutUICount) | This method accepts user information to be used within transporter for addressing outbound transaction. The various arguments are described below:<br>1. ppszOutUserInfo argument contains array of pointers to strings containing user information for addressing outbound transaction.<br>2. uOutUICount specifies number of strings in ppszOutUserInfo data structure. |
| BOOL bDeleteTx(USHORT *uDeleteTxFlag) | This method marks the input messages from WEA as read once they are processed and deletes the memory allocated for private data members of STFTransMsg. |
| ~STFTransMsg( ) | Destructor used for deleting ppszInUserInfo data member. |

Protected Methods

| Method Name | Method Description |
|---|---|
| virtual BOOL bCreateMsg(PPSZ ppszFmtOut, USHORT uFmtOutCount) | This is a protected virtual method that is overloaded by appropriate member functions of STFTransMsgMHS and STFTransMsgVIM derived classes. It creates an attachment file from array of pointers to strings passed as argument to it. |
| virtual BOOL bSetMsgHdr( ) | This is a protected virtual function that will be overloaded by bSetMsgHdr( ) methods of STFTransMsgMHS or STFTransMsgVIM derived classes. It creates the message header structure from array of pointers to string containing user information like receiver name and address as input |
| virtual BOOL bSendMsg( ) | This is a protected virtual function that will be overloaded by bSendMsg( ) methods of STFTransMsgMHS or STFTransMsgVIM derived classes. It posts the attachment file and message as output to WEA. |
| virtual BOOL bQueryNewMsg(BOOL *pbMore) | This method is overloaded by bQueryNewMsg( ) method of STFTransMsgMHS or STFTransMsgVIM derived classes. It polls for WEA input and returns Boolean indicating presence or absence of WEA input. It as well sets the more flag in case more unread messages are present. |
| virtual BOOL bOpenMsg( ) | This method is overloaded by bOpenMsg( ) method of STFTransMsgMHS or STFTransMsgVIM derived classes. It opens and reads the incoming unread message file for attachment file name and user information. |
| virtual BOOL bMarkMsgRead(USHORT *uDeleteTxFlag); | This method is overloaded by bMarkMsgRead( ) functions of STFTransMsgMHS or STFTransMsgVIM derived classes. |
| virtual BOOL bGetMsgItem(PPSZ ppszInputTx, USHORT* puInputTx) | This method is overloaded by bGetMsgItem( ) method of STFTransMsgMHS or STFTransMsgVIM derived classes. It passes reference to array of pointers containing item names, values and flags of the transaction. It will be used by bGetInputTx( ) public method of this class. |
| virtual BOOL bCloseMsg( ) | This method closes all the resources opened by bOpenMsg( ) method. |

Class Name: STFTransMsgMHS

Class Description

The STFTransMsg MHS derived class consists of a set of public methods which overload the methods of the STFTransMsg derived class. This set of public methods are specific to MHS messaging environment.

| | |
|---|---|
| Super Class | STFTransMsg |
| Sub Classes | None |
| Classes Used | None |

Attributes

| Attribute Name | Attribute Description |
|---|---|
| pIniFile | pointer to INIFile |
| ppszMsgHdr | array of pointers to store message header. |
| uMsgHdrCount | number of elements in ppszMsgHdr |
| hOutMsgFil | Output message file handle. |
| pszInAttFilName | Input attachment file name |
| pszOutAttFilName | Output attached file name. |
| pszUnreadMsgFilName | Input Unread message file name |
| szInMsgFilPath | Input message mail directory path. |
| szInAttFilPath | Input parcel directory(attached file) path |
| szSndMsgFilPath | Output message directory path. |
| szSndAttFilPath | Output parcel directory(attached file) path. |
| pszStfAppName | STF Application name. |
| szSMF—70[ ] | constant char string containing SMF signature SMF-70 |
| szFrom[ ] | constant char string containing SMF "From:"field. |
| szTo[ ] | constant char string containing SMF "To:" field. |
| szAttachment[ ] | constant char string containing SMF "Attachment:" field. |
| szStf | constant string containing STF keyword. |

Private Methods

| Method Name | Method Description |
|---|---|
| BOOL bSetPath( ) | This method sets up the paths specific to MHS messaging environment. Returns |

-continued

| | |
|---|---|
| PSZ pszGetMHSMV( ) | true if paths are set properly. This method returns the master volume environment variable MV necessary for setting up the MHS environment. |

Public Methods

| Method Name | Method Description |
|---|---|
| STFTransMsgMHS( ) | Constructor of STFTransMsgMHS class. It initializes private data members of STFTransMsgMHS |
| virtual BOOL bCreateMsg(PPSZ ppszFmtOut, USHORT uFmtOutCount) | This creates a temporary file from array of pointers to strings passed by formatter in ppszFmtOut and assigns the unique file name created to pszOutAttFilName data member. The steps followed by this method are given below.<br>1. Create a unique file from a global integer variable which is appended with STF keyword.<br>2. Open the file using DOS Open command in non-shareable, write only mode.<br>3. Writes strings from ppszFmtOut into file separating them with a new line character (0x0D 0x0A) |
| virtual BOOL bSetMsgHdr( ) | The procedure followed by this method to accomplish its task is broadly categorized in following steps.<br>1. Allocate storage for ppszMsgHdr data member.<br>2. Create SMF message header as array of strings in ppszMsgHdr using ppszOutUserInfo and uOutUserInfoCount for recipient (To:) field.<br>3. Assign the attachment file name created by bCreateMsg( ) method (pszOutAttFilName) to Attachment field of SMF header.<br>4. Assign the Attachment type field of SMF header as STF.<br>5. Assign From:field of SMF to application name given by pszStfAppName variable. |
| virtual BOOL bSendMsg( ) | This method creates a message file from array of pointers to strings compiled by bSetMsgHdr( ) in ppszMsgHdr data structure in output mail directory. This completes the posting operation of SMF message in MHS environment. It returns Boolean indicating success or failure of the operation. The steps followed in this method are given below:<br>1. Create a unique file from a global integer variable which is appended with STF keyword.<br>2. Open the file using DosOpen command in non-shareable, write only mode.<br>3. Writes strings from ppszMsgHdr into file separating them with a new line character (0x0D 0x0A) |
| virtual BOOL bQueryNewMsg(BOOL *pbMore) | This method polls the (STF processor) mail directory to check for incoming messages. Returns Boolean indicating presence or absence of inputs from WEA and stores the name of first unread file in pszUnreadMsgFilName private data member. It as well updates a more flag if more unread messages are present. |
| virtual BOOL bOpenMsg( ) | This method opens up the first unread message given by private data member pszUnreadMsgFilName, scans message file for attachment file name and From fields. The steps followed by this method are given below.<br>1. Opens the file given by pszUnreadMsgFilName using fopen( ) in read only mode.<br>3. Reads contents of file using fgets( ) function and compares each string with szAttachment. Extracts the name of file and sets it in pszInAttFilName data member.<br>4. Similarly compare each string with szFrom to get the sender of the message and assign it in pszInUserInfo field data member. |
| virtual BOOL bGetMsgItem(PPSZ ppszInputTx, USHORT*, pInputTxCount) | This method formulates an array of pointers to strings in ppszInputTx and pointer to count of strings contained in pInputTxCount from the data read from pszInAttFilName member. The steps followed in this method are given below.<br>1. Opens attachment file given by pszOutAttFilName and szInAttPath using fopen( ) function.<br>2. Allocate memory for ppszInputTx elements.<br>3. Reads the contents of file line by line using fgets( ) function and stores it as a string in ppszInputTx.<br>4. Sets the number of lines read in pInputTxCount.<br>5. Closes attachment file. |
| virtual BOOL bCloseMsg( ) | Closes all the resources opened by bOpenMsg( ) method. |
| virtual BOOL bMarkMsgRead(USHORT *uDeleteTxFlag) | This method stamps the messages as read after a transaction is processed. |
| ~STFTransMsgMHS( ) | Destructor for STFTransMsgMHS. It deletes memory for some of its private data members. |

Class Name: STFTransMsgVIM
Class Description
The STFTransMsg VIM derived class consists of a set of public methods which overload the methods of the STFTransMsg derived class. This set of public methods are specific to VIM messaging environment.

Super Class
STFTransMsg
Sub Classes
None
Attributes

| Attribute Name | Attribute Description |
|---|---|
| vSession | VIM session identifier |
| vMsg | VIM open message identifier |
| vInMsg | VIM open Message identifier for inbound message |
| vRef | VIM message reference position |
| vContainer | VIM open message container identifier |

Public Methods

| Method Name | Method Description |
|---|---|
| TransMsgVIM(INIFILE *pINIFile) | Constructor of STFTransMsgVIM object. It opens a VIM session using VIMOpenSession( ) API call. |
| virtual BOOL CreateMsg(PPSZ ppszFmtOut, USHORT uFmtOutCount) | This method creates an outbound message. It uses the VIMCreateMsg( ) VIM API |

| | |
|---|---|
| virtual BOOL SetMsgHdr( ) | provided in VIM.DLL. It gets pointer to string containing user information like sender, recipient from TransMsg methods from which it creates the message header using following VIM API calls 1. VIMSetMessageHeader( ) 2. VIMSetMessageRecipient( ) |
| virtual BOOL SendMsg( ) | This method posts the message along with attachment file using following VIM API calls. 1. VIMSetMessageItem associates an attachment file with message formulated by VIMCreateMessage( ) 2. VIMSendMessage( ) posts the message along with attachment file. |
| virtual BOOL QueryNewMsg(BOOL *pMore) | This method polls the mail directory to check for new messages. Uses following VIM API calls 1. VIMOpenMessageContainer( ) opens a message container containing inbound mail. 2. VIMEnumerateMessages( ) enumerates the messages and gets the message reference of first unread message. |
| virtual BOOL OpenMsg( ) | Opens the incoming message using VIMOpenMessage( ) method provided by VIM.DLL.. |
| virtual BOOL GetMsgItem(PPSZ ppszInputTx, USHORT * uInputTxCount) | This method extracts the attachment file information from container box using following VIM API calls. 1. VIMEnumerateMessageItems( ) enumerates the message for attachment files. 2. VIMGetMsgItem( ) extracts the attachment file item and stores the contents in ppszInputTx. |
| virtual BOOL CloseMsg( ) | Closes all the resources opened using VIMCloseMessage( ) API call. |
| virtual BOOL MarkMsgRead( ) | This method stamps the messages after they are read. It uses VIMMarkMessageRead( ) method of VIM.DLL. |
| ~TransMsgVIM( ) | Destructor of STFTransMsgVIM. Closes a VIM session using VIMCloseSession( ) function. |

Class Name: STFTransDB

Class Description

STFTransDB derived class consists of a set of public methods which overload the appropriate methods of the STFTransporter class to incorporate Database specific features. The STFTransDB derived class also contains a set of protected virtual methods which are used in defining the set of the STFTransDB public methods, i.e. in writing the code of these public methods. This set of protected virtual methods in turn is overloaded by the methods of the derived class STFTransDBSQL in case of Database environment based on SQL.

Super Class
STFTransporter
Sub Class
STFTransDBSQL handles SQL Database environment Classes Used
None
Attributes

| Attribute Name | Attribute Description |
|---|---|
| ppszDBServerInfo | Database Management System Information |
| uDBServerInfoCount | number of elements in ppszDBServerInfo |

Public Methods

| Method Name | Method Description |
|---|---|
| STFTransDB( ) | Consructor used for initializing the database management system information. |
| USHORT uGetInputTx(PPSZ ppszAWESTFInputTx, USHORT* uInTxCount, BOOL *pbMoreInputs) | This method uses protected virtual methods which are overloaded by appropriate methods of STFTransDBSQL derived class. It gets the inbound transaction, database server information. 1. the ppszAWEASTFInputTx argument receives reference to array of pointers to strings containing transactions sent by WEA. 2. uInTxCount specifies count of strings in ppszAWEASTFInputTx. 3 pMoreInputs flag indicates if more unread STF database records are present. This flag is useful in processing multiple input transactions. |
| BOOL bWriteWEAOutput(PPSZ ppszFmtOutput, USHORT uFOCount) | This method accepts parameters for creating an outbound transaction to be sent to WEA. It accepts array of pointers to strings from which a return Transaction is formulated as a database record and writes it onto the STF shared database. It makes use of protected virtual methods that are overloaded by the appropriate methods of STFTransDBSQL derived class. Various arguments are given below. 1. ppszFmtOutput argument contains formatter output Transaction for onward delivery to WEA. 2. uFOCount argument specifies number of strings in ppszFmtOutput. |
| BOOL bGetInDBInfo(PPSZ ppszDBServerInfo, USHORT* pDBInfoCount) | This method gets STF database and dictionary information that is stored in ppszDBServerInfo private data member. This is used for writing the database records onto STF Database. The various arguments passed are given as under. 1. the ppszDBServerInfo argument contains Input STF Database management system information for reading and writing records to the database. 2. pDBInfoCount points to number of strings in ppszDBServerInfo. |
| BOOL bPutOutDBInfo(PPSZ ppszDBServerInfo, USHORT uOutDBCount) | This method accepts database management system information to be used within the transporter for addressing outbound |

| | |
|---|---|
| BOOL bDeleteTx(USHORT *uDeleteTxFlag) | transaction.<br>The various arguments are described below.<br>1. the ppszDBServerInfo argument contains array of pointers to strings containing user information for addressing outbound transaction.<br>2. uOutDBCount specifies number of strings in ppszDBServerInfo data structure.<br>This method marks the input database record from WEA as read once they are processed and deletes the memory allocated for private data members of STFTransDB. |
| ~STFTransDB( ) | Destructor used for deleting ppszDBServerInfo data member. |

Protected Methods

| Method Name | Method Description |
|---|---|
| virtual BOOL bCreateSTFRecord(PPSZ ppszFmtOut, USHORT uFmtOutCount) | This is a protected virtual method that will be overloaded by appropriate member functions of STFTransDBSQL derived class. It creates a database record from array of pointers to strings passed as argument to it. |
| virtual BOOL bQueryNewSTFRecord(BOOL *pbMore) | This method is overloaded by bQueryNewSTFRecord( ) method of STFTransDBSQL derived class. It polls for AWEA records written onto STF Database and returns Boolean indicating presence or absence of AWEA input. It also sets the more flag in case more unread records are present in the STF Database. |
| virtual BOOL bDeleteSTFRecord(USHORT *uDeleteTxFlag). | This method is overloaded by bDeleteSTFRecord( ) method of STFTransDBSQL derived class. |
| virtual BOOL bReadSTFRecord(PPSZ ppszInputTx, USHORT* puInputTx) | This method is overloaded by bReadSTFRecord( ) method of STFTransDBSQL derived class. It passes reference to array of pointers containing STF keyword names, values and flags of the transaction. It is used by bGetInputTx( ) public method of this class. |

Class Name: STFTransDBSOL

Class Description

The STFTransDBSQL derived class from STFTransDB consists of a set of public methods which overload the methods of the STFTransDB derived class. This set of public methods are specific to SQL Database Server environment.

| | |
|---|---|
| Super Class | STFTransDB |
| Sub Classes | None |
| Classes Used | None |
| Attributes | |

| Attribute Name | Attribute Description |
|---|---|
| pszSQLDBName | SQL database name |
| ppszSQLTabName | Array of SQL tables in the SQL database. |
| uSQLTabCount | number of tables in the SQL database |

Private Methods
None
Public Methods

| Method Name | Method Description |
|---|---|
| STFTransDBSQL( ) | Constructor of STFTransDBSQL class. It initializes private data members of STFTransDBSQL |
| virtual BOOL bCreateSTFRecord(PPSZ ppszFmtOut, USHORT uFmtOutCount) | This creates record in the output STF DB tables and writes strings from ppszFmtOut into the database tables. |
| virtual BOOL bQueryNewSTFRecord(BOOL *pbMore) | This method polls the STF processor database tables for new transactions with Transaction ID as the key. Returns Boolean indicating presence or absence of inputs from WEA and stores the WEA input record. It updates a more flag if more unread records are present in the STF database. |
| virtual BOOL bReadSTFRecord(PPSZ ppszInputTx, USHORT* pInputTxCount) | This method formulates an array of pointers to strings in ppszInputTx and pointer to count of strings contained in pInputTxCount from the data read from the STF database tables. |
| virtual BOOL bDeleteSTFRecord(USHORT *uDeleteTxFlag) | This method deletes the processed STF Record from the STF SQL database tables. |
| ~STFTransDBSQL( ) | Destructor for STFTransDBSQL It deletes memory for some of its private data members. |

Class Name: TxParser

Class Description

This class parses the WEA input which is stored as an array of strings stored in the attributes. It has methods for parsing and returning keyword values from input STF Transactions. Please refer to Appendix-B for a list of keywords and their explanations. The TxParser object is created by the TxProcessor for getting Input Transaction from STFTransporter.

| | |
|---|---|
| Super Class | None |
| Sub Classes | None |
| Classes Used | STFTransporter - used to get STF Transaction strings. |
| Attributes | |

| Attribute Name | Attribute Description |
|---|---|
| pTransporter | Pointer to STFTransporter base class |
| ppszInSTFTx | pointer to array of strings containing input transactions read from transporter. |

| | -continued |
|---|---|
| uInSTFTxCount | Number of strings stored in ppszInSTFTx |
| Method Name | Method Description |
| Public Methods | |
| TxParser (STFTransporter *pTransporter) | Constructor that accepts pointer to STFTransporter and stores it in its private data member. |
| USHORT uGetTransInput (BOOL *pbMoreTx) | This method calls the STFTransporter method bGetInputTx () to get the STF Transaction and stores it in ppszInSTFTx |
| BOOL bIsSTFTxKwdExist (PSZ pszKwd) | This method checks whether the given keyword exists in the ppszInSTFTx. It returns TRUE if the keyword exists, else FALSE. |
| INT iIsSTFTxKwdExist (PSZ pszKwd) | This method checks whether the given keyword exists in the ppszInSTFTx. It returns the index of the keyword in ppszInSTFTx array of strings and returns −1 if the keyword was not found. |
| PSZ pszParseSTFValue (PSZ pszKwd, CHAR *pcFlag, USHORT * puPrsStatus) | This method returns the keyword value associated with the pszKwd and updates the STF keyword type flag in pcFlag. |
| BOOL bGetSTFTxType (USHORT *puType) | This method updates the puType with the STF Transaction type. |
| The following methods are used to get STF Transaction keyword values are overloaded for different keyword types. | |
| USHORT uGetSTFTxKwdValue (PSZ pszKwd, PPSZ ppszKwdValue) | This method updates the keyword value ppszKwdValue associated with the pszKwd keyword. |
| USHORT uGetSTFTxKwdValue (PSZ pszKwd, USHORT *puKwdValue) | This method updates the keyword value puKwdValue associated with the pszKwd keyword. |
| USHORT uGetSTFTxKwdValue (PSZ pszKwd, INT *piKwdValue) | This method updates the keyword value piKwdValue associated with the pszKwd keyword. |
| USHORT uGetSTFTxKwdValue (PSZ pszKwd, LONG *plKwdValue) | This method updates the keyword value plKwdValue associated with the pszKwd keyword. |
| USHORT uGetSTFTxKwdValue (PSZ pszKwd, BOOL *pbKwdValue) | This method updates the keyword value pbKwdValue associated with the pszKwd keyword. |
| USHORT uGetSTFTxKwdValue (PSZ pszKwd, LPDATETIMET pDateTime) | This method updates the keyword value structure pDateTime. |
| USHORT uGetSTFTxKwdValue (PSZ pszKwd, LPORG2ID pORG2ID, INT *piCount) | This method updates the structure pORG2ID and the count associated with the pszKwd. |
| USHORT uGetSTFTxKwdValue (PSZ pszKwd, LPTXBDFIELDSTRUCT pBData, INT *piCount) | This method updates the structure pBData and the count associated with the pszKwd. |
| BOOL bcheckInputTx () | Checks if data is present in ppszInSTFTx. |
| VOID vDeleteParserData () | Deletes data stored in ppszInSTFTx and resets the uInSTFTxCount. |
| ~TxParser () | This method is the destructor which deletes the transaction data. |

Class Name: TxFormatter
  Class Description
  This class contains methods to produce STF Transaction from keyword values for the STFTransporter. This class will hide the Transaction from knowing about the external interface to WEA. It will essentially format the data required by the STFTransporter to output an STF Transaction. This class is used by Transaction class. The TxFormatter will call STFTransporter method and pass array of STF keyword strings stored by the TxFormatter. The TxFormatter keeps on accumulating STF keyword strings till it gets bFmtEnd() message. The bFmtEnd() will call STFTransporter method to write the STF Transaction to the WEA.

Super Class
  None
Sub Classes
  None
Classes Used
  STF_Tx STF_Tx class to get the STFTransporter pointer
  STFTransporter STFTransporter class to output the STF Transaction
Attributes

| Attribute Name | Attribute Description |
|---|---|
| ppszOutSTFTx | data structure containing output transaction. |
| uOutSTFTxCount | Number of strings in ppszOutSTFTx. |

| Public Methods | |
|---|---|
| Method Name | Method Description |
| TxFormatter( ) | This method is he constructor for this class which initializes the attributes. |
| BOOL bFmtStart( ) | This method starts the formatter initializing the array of pointers to hold the STF keywords and values. This is equivalent to opening a file. |
| BOOL bFmtEnd(STF_Tx *pSTF_Tx) | This method signals the formatter that all the data that needs to be sent to WEA has been formatted and can call STFTransporter method to write the STF Transaction to the output. This is equivalent to closing and flushing a file. |

The following methods are used to format STF Transaction keyword and value are overloaded for different keyword types.

| Method Name | Method Description |
|---|---|
| BOOL bFmtKwd (PSZ pszKwd, PSZ pszKwdValue) | This method formats the pszKwd and pszKwdValue in the form pszKgwd:pszKwdValue. |
| BOOL bFmtKwd (PSZ pszKwd, INT iKwdValue) | This method formats the pszKwd and iKwdValue in the form pszKwd:iKwdValue. |
| BOOL bFmtKwd (PSZ pszKwd, USHORT uKwdValue) | This method formats the pszKwd and uKwdValue in the form pszKwd:uKwdValue. |
| BOOL bFmtKwd (PSZ pszKwd, LONG lKwdValue) | This method formats the pszKwd and lKwdValue in the form pszKwd:lKwdValue. |
| BOOL bFmtKwd (PSZ pszKwd, LPWFLIST pWFList, INT iCount) | This method formats the pszKwd and pwFList contents in the form pszKwd:pWFList[0];pWFList[1]; . . . pWFList [iCount-1] |

45

-continued

| Method Name | Method Description |
|---|---|
| BOOL bFmtKwd (PSZ pszKwd, LPBPLIST pBPList, INT iCount) | This method formats the pszKwd and ppBPList contents in the form pszKwd:pBPList[0];pBpList[1]; . . . pBpList [iCount-1] |
| BOOL bFmtKwd (PSZ pszKwd, LPSTATUS pStatus) | This method formats the pszKwd and pStatus contents in the form pszKwd:pStatus |
| BOOL bFmtKwd (PSZ pszKwd, LPACTINFO pActInfo, INT iCount) | This method formats the pszKwd and ppActInfo contents in the form pszKwd:pActInfo[0];pActInfo[1]; . . . pActInfo[iCount-1] |
| ~TxFormatter () | This method is the destructor for this class which de-initializes the attributes. |

Class Name: Envelope

Class Description

This class handles addressing information of WEA. It is used by STF_Tx, BoundData and Transaction classes.

Super Class
None
Subclass
None
Classes Used
STF_Tx used to access STFTransporter, BoundData and Transaction methods.
STFTransporter used to get addressing information of inbound transactions.
Transaction used to get addressing information of outbound transactions.
BoundData used to get addressing information of outbound transactions.
Attributes

| Attribute Name | Attribute Description |
|---|---|
| ppszInUserInfo | pointer to array of strings containing inbound user information. |
| uInUserInfoCount | Number of items in ppszInUserInfo |
| ppszOutUserInfo | pointer to array of strings containing outbound user info. |
| uOutUserInfoCount | Number of items in ppszOutUserInfo |

Public Methods

| Method Name | Method Description |
|---|---|
| Envelope( ) | This method is the constructor which initializes the attributes. |
| BOOL bPutInUserInfo(STF_Tx *pSTF_Tx) | This method calls transporter method bGetInUserInfo( ) to get addressing information of currently processed inbound transaction and stores it in its private data member. |
| PSZ pszGetInUserInfo( ) | This method returns a string containing addressing information which is built from various elements of ppszInUserInfo. |
| BOOL bPutOutUserInfo(STF_Tx *pSTF_Tx, PSZ pszUserInfo) | This method accepts string containing user information converts it into appropriate format as required by STFTransporter for addressing and calls STFTransporter method for handing user |

46

-continued

| | information for current Outbound transaction. |
|---|---|
| BOOL bGetOutUserInfo(PPSZ ppszOutUserInfo, USHORT *puOutUserInfoCount) | This method returns the outbound user information stored in the attributes. |
| ~Envelope( ) | This method is the destructor which de-initializes the attributes. |

Class Name: BoundData

Class Description

This class stores and handles all bound data associated with a transaction.

Super Class
None
Sub Classes
None
Classes Used
STF_Tx, STFTxKwd
Attributes

| Attribute Name | Attribute Description |
|---|---|
| pSTFTx | Pointer to STF_Tx object |
| szBDKwd | BOUNDDATA keyword string |
| szFormName | Form Name |
| iBDCount | Number of BD structures |
| pBoundData | Pointer to array of Bound Data structures |

Public Methods

| Method Name | Method Description |
|---|---|
| BoundData(STF_Tx *pSTF_Tx) | This method is the constructor which updates pSTFTx with the passed parameter and szBDKwd by instantiating STFTxKwd |
| USHORT uPutInTxBoundData( ) | This method updates the bound data attributes from the input transaction using TxParser method. |
| BOOL bPutGetTxBoundData(BOOL bActOrState, INT iActOrState) | This method gets the ActOrState Flag and ActOrState value and updates the bound data attributes by calling AWSTGetBoundData( ) and AWSTGetBDFieldAttributes( ). This method is for 'Get' type of transactions. |
| BOOL bPutRtnTxBoundData(LONG lTxId) | This method gets the Transaction ID and calls the overloaded methods of AWSTGetBoundData( ) and AWSTGetBDFieldAttributes( ) and updates the bound data attributes. This method is for 'Return' type of transactions. |
| BOOL bBindAppData( ) | This method is used to call AWSTBindAppData( ) to bind the application data with respect to a business process or a workflow. |
| PSZ pszGetBoundDataStream( ) | This method is used to return the bound data structure values as a string. |
| ~BoundData( ) | This method is the destructor which de-initializes the attributes. |

Class Name: STF TX

Class Description

This class is used to process the inbound as well as the outbound transactions. It has methods to get the transaction type. It initiates the Transaction class based on the transaction type.

Super Class
None
Sub Classes
None
Classes Used
Transaction, STFTransporter, TxParser, TxFormatter, INIFile, Envelope, and BoundData.
Attributes

| Attribute Name | Attribute Description |
|---|---|
| uInOrOutTx | Flag to indicate Inbound or Outbound Transaction |
| uTxType | Transaction type |
| lTxID | Transaction ID assigned by the workflow server |
| bConstrFailed | Flag to indicate whether STF_Tx constructor failed or not |
| pTransaction | Pointer to Transaction class |
| pTransporter | Pointer to STFTransporter class |
| pTxParser | Pointer to TxParser class |
| pTxFormatter | Pointer to TxFormatter class |
| pINIFile | Pointer to INIFile class |
| pEnvelope | Pointer to Envelope |
| pBD | Pointer to BoundData |

Private Methods
None
Public Methods

| Method Name | Method Description |
|---|---|
| STF_Tx(USHORT uInOrOutTx, STFTransporter *pTransporter, TxParser *pTxParser, TxFormatter *pTxFormatter, INIFile *pINIFile) | This method is the constructor which accepts the mode which indicates whether input or output transaction. Based on this mode, it instantiates the transaction objects. |
| ~STF_Tx( ) | This method is the destructor which deletes all data related to transaction instantiated in the constructor. |

Class Name: TxProcessor

Class Description

This is the main controlling class of STF processor. It has pointers to STFTransporter TxParser, TxFormatter and STF_Tx and INIFile classes in the STF Processor. TxProcessor will be instantiated once during an STF Session (in the main program).

Super Class
None
Subclass
None
Classes Used
STFTransporter, TxParser, TxFormatter, STF_Tx and INIFile.
Attributes

| Attribute Name | Attribute Description |
|---|---|
| pTransporter | Pointer to STFTransporter class |
| pTxPrs | Pointer to TxParser class |
| pTxFormatter | Pointer to TxFormatter class |
| pSTF_Tx | Pointer to STF_Tx class |
| pINIFile | Pointer to INIFile class |

Public Methods

| Method Name | Method Description |
|---|---|
| TxProcessor( ) | This method is the constructor of TxProcessor which instantiates STFTransporter, TxParser, TxFormatter and INIFile. |
| BOOL bProcessInputTx(BOOL *pbMoreTx) | This method processes the input Transaction data by instantiating STF_Tx in Input mode. |
| BOOL bProcessOutputTx( ) | This method processes the output Transaction data by instantiating STF_Tx in Output mode. |
| ~TxProcessor( ) | This method is the destructor of TxProcessor which deletes all data member pointers. |

Class Name: Transaction

Class Description

This class is the base class for the various types of WEA transaction classes It has virtual method to process the required Transactions.

Super Class
None
Sub Classes
InitBP, InitWF, Act, BindData, GetWFStatus, GetPendingActions, GetAvailableBPs, ReturnWFStatus
Classes Used
STF_Tx
Attributes

| Attribute Name | Attribute Description |
|---|---|
| pSTF_Tx | Pointer to STF_Tx class |
| bRtnStatus | Flag to indicate whether WEA requested Status of Transaction |
| bRtnBData | Flag to indicate whether WEA requested Bound Data |
| lAWSTError | Error returned by workflow server API(s) |
| BPTid | Business Process Transaction ID |
| WFTid | WorkFlow Transaction ID |
| Identity | Identity of the person who is initiating the Transaction. |
| ppszSTFTxId | STF Transaction ID sent by WEA |

Public Methods

| Method Name | Method Description |
|---|---|
| Transaction(STF_Tx *pSTFTx) | This method is the constructor which accepts the pointer to STF_Tx class and substitutes it in pSTF_Tx data member. |
| virtual BOOL bDoIt( ) | This virtual method is used to call workflow server API(s) and Formatter to process the Transactions. By default it processes invalid Transactions. |
| ~Transaction( ) | This method is the destructor which de-allocates all the memory occupied by data members. |

Class Name: STFTxKwd

Class Description

This class defines STF Transaction keywords. This is used by the Transaction class to get keyword string and values for calling workflow server APIs and to send return values of workflow server APIs to TxFormatter. The constructor of this class gets the keyword string from Resource.

Super Class
None
Sub Classes
None
Classes Used
TxParser STF Transaction Parser
Attributes

| Attribute Name | Attribute Description |
| --- | --- |
| pSTF_Tx | Pointer to STF_Tx class (to get Parser pointer) |
| szKwd | STF Keyword string |

Public Methods

| Method Name | Method Description |
| --- | --- |
| STFTxKwd(STF_Tx *pSTFTx, USHORT uKwdID) | This constructor accepts the pointer to STF_Tx class and the keyword ID (defined in the Resource). It fills the szKwd data member corresponding to uKwdID from the Resource. |
| PSZ pszGetKwd( ) | This method returns szKwd stored in the object. |
| VOID vGetKwd(PSZ pszKwd) | This method updates pszKwd with szKwd stored in the object. This method assumes that the caller allocates memory for pszKwd. |
| USHORT uGetKwdValue(PPSZ ppszKwdValueStr) | This method outputs the keyword value corresponding to the szKwd stored in the object using Parser's method bGetSTFTxKwdValue( ). |

The following methods are overloaded for different keyword data types.

| Method Name | Method Description |
| --- | --- |
| USHORT uGetKwdValue(USHORT *puKwd) | This method outputs the keyword value in puKwd corresponding to the data member szKwd stored in the object using Parser's method bGetSTFTxKwdValue( ). |
| USHORT uGetKwdValue(INT *piKwd) | This method outputs the keyword value in piKwd corresponding to the data member szKwd stored in the object using Parser's method bGetSTFTxKwdValue( ). |
| USHORT uGetKwdValue(LONG *plKwd) | This method outputs the keyword value in plKwd corresponding to the data member szKwd stored in the object using Parser's method bGetSTFTxKwdValue( ). |
| USHORT uGetKwdValue(BOOL *pbKwd) | This method outputs the keyword value in pbKwd corresponding to the data member szKwd stored in the object using Parser's method bGetSTFTxKwdValue( ). |
| USHORT uGetKwdValue(LPDATETIMET pDateTime) | This method outputs the keyword value in pDataTime corresponding to the data member szKwd stored in the object using Parser's method bGetSTFTxKwdValue( ). |
| USHORT uGetKwdValue(LPORG2ID pOrg2ID, INT *piCount) | This method outputs the keyword values in pOrg2ID and piCount corresponding to the data member szKwd stored in the object using Parser's method bGetSTFTxKwdValue( ). |
| ~STFTxKwd( ) | This method is the destructor which does nothing. |

Class Name: InitBP

Class Description

This class is derived from Transaction class and it has methods to call workflow server API and the TxFormatter.

Super Class
Transaction
Sub Classes
None
Classes Used
STF_Tx, STFTxKwd.
Attributes

| Attribute Name | Attribute Description |
| --- | --- |
| None | None |

Private Methods

| Method Name | Method Description |
| --- | --- |
| BOOL bCallAPI( ) | This method is used to call the workflow server API to initiate business process. To get the parameters needed for the workflow server API call, it instantiates the STFTxKwd objects for different parameters. |
| BOOL bCallFormatter(STF_Tx *pSTF_Tx) | This method is used to call TxFormatter to format the return values got from workflow server API. Using pSTF_Tx, it gets the pointer to TxFormatter. |

Public Methods

| Method Name | Method Description |
| --- | --- |
| InitBP(STF_Tx *pSTFTx) | This method is the constructor which accepts the pointer to STF_Tx class which will be used by other methods of this class. |
| virtual BOOL bDoIt( ) | This method calls the private methods bCallAPI( ) and bCallFormatter( ) to process this Transaction. |
| ~InitBP( ) | This method is the destructor which de-initializes all the attributes. |

Class Name: InitWF

Class Description

This class is derived from Transaction class and it has methods to call workflow server API and the TxFormatter.

| | |
|---|---|
| Super Class | Transaction |
| Sub Classes | None |
| Classes Used | STF_Tx, STFTxKwd. |
| Attributes | |

| Attribute Name | Attribute Description |
|---|---|
| None | None |

Private Methods

| Method Name | Method Description |
|---|---|
| BOOL bCallAPI( ) | This method is used to call the workflow server API to initiate workflow. To get the parameters needed for the workflow server API call, it instantiates the STFTxKwd objects for different parameters. |
| BOOL bCallFormatter(STF_Tx *pSTF_Tx) | This method is used to call TxFormatter to format the return values got from workflow server API. Using pSTF_Tx, it gets the pointer to TxFormatter. |

Public Methods

| Method Name | Method Description |
|---|---|
| InitWF(STF_Tx *pSTFTx) | This method is the constructor which accepts the pointer to STF_Tx class which will be used by other methods of this class. |
| virtual BOOL bDoIt( ) | This method calls the private methods bCallAPI( ) and bCallFormatter( ) to process this Transaction. |
| ~InitWF( ) | This method is the destructor which de-initializes all the attributes. |

Class Name: Act
  Class Description
  This class is derived from Transaction class and it has methods to call workflow server API and the TxFormatter.

| | |
|---|---|
| Super Class | Transaction |
| Sub Classes | None |
| Classes Used | STFTxKwd, STFTxKwd. |
| Attributes | |

| Attribute Name | Attribute Description |
|---|---|
| None | None |

Private Methods

| Method Name | Method Description |
|---|---|
| BOOL bCallAPI( ) | This method is used to call the workflow server API(s) to act on a workflow. To get the parameters needed for the workflow server API call, it instantiates the STFTxKwd objects for different parameters. |
| BOOL bCallFormatter(STF_Tx *pSTF_Tx) | This method is used to call TxFormatter to format the return values got from workflow server API. Using pSTF_Tx, it gets the pointer to TxFormatter. |

Public Methods

| Method Name | Method Description |
|---|---|
| Act(STF_Tx *pSTFTx) | This method is the constructor which accepts the pointer to STF_Tx class which will be used by other methods of this class. |
| virtual BOOL bDoIt( ) | This method calls the private methods bCallAPI( ) and bCallFormatter( ) to process this Transaction. |
| ~Act( ) | This method is the destructor which de-initializes all the attributes. |

Class Name: BindData
  Class Description
  This class is derived from Transaction class and it has methods to call workflow server API and the TxFormatter.

| | |
|---|---|
| Super Class | Transaction |
| Sub Classes | None |
| Classes Used | STFTxKwd |
| Attributes | |

| Attribute Name | Attribute Description |
|---|---|
| None | None |

Private Methods

| Method Name | Method Description |
|---|---|
| BOOL bCallAPI( ) | This method is used to call the workflow server API to bind the application data to a business process or a workflow. It instantiates Bound Data object to perform this operation. |
| BOOL bCallFormatter(STF_Tx *pSTF_Tx) | This method is used to call TxFormatter to format the return values got from workflow server API. Using pSTF_Tx, it gets the pointer to TxFormatter. |

Public Methods

| Method Name | Method Description |
|---|---|
| BindData(STF_Tx *pSTFTx) | This method is the constructor which accepts the pointer to STF_TX class which will be used by other methods of this class. |
| virtual BOOL bDoIt( ) | This method calls the private methods bCallAPI( ) and bCallFormatter( ) to process this Transaction. |
| ~BindData( ) | This method is the destructor which de-initializes all the attributes. |

Class Name: GetWFStatus
  Class Description
  This class is derived from Transaction class and has methods to call workflow server API and the TxFormatter.

| | |
|---|---|
| Super Class | |
| Transaction | |
| Sub Classes | |
| None | |
| Classes Used | |
| STFTxKwd, STFTxKwd. | |
| Attributes | |

| Attribute Name | Attribute Description |
|---|---|
| pStatus | Structure which has the Status string |
| iActCount | Number of ActInfo structures returned |
| ppActInfo | Array of ActInfo structures |

Private Methods

| Method Name | Method Description |
|---|---|
| BOOL bCallAPI( ) | This method is used to call the workflow server API(s) to get the status of the workflow. To get the parameters needed for the workflow server API call(s), it instantiates the STFTxKwd objects for different parameters. To process Bound Data related information, it instantiates Bound Data object. |
| BOOL bCallFormatter(STF_Tx *pSTF_Tx) | This method is used to call. TxFormatter to format the return values got from workflow server API. Using pSTF_Tx, it gets the pointer to TxFormatter. |

Public Methods

| Method Name | Method Description |
|---|---|
| GetWFStatus(STF_Tx *pSTFTx) | This constructor which accepts the pointer to STF_Tx class which will be used by other methods. |
| virtual BOOL bDoIt( ) | This method calls the private methods bCallAPI( ) and bCallFormatter( ) to process this Transaction. |
| ~GetWFStatus( ) | This method is the destructor which de-initializes all the attributes. |

Class Name: GetPendingActions

Class Description

This class is derived from Transaction class and it has methods to call workflow server API and the TxFormatter.

| | |
|---|---|
| Super Class | |
| Transaction | |
| Subclass | |
| None | |
| Classes Used | |
| STF_Tx, STFTxKwd. | |
| Attributes | |

| Attribute Name | Attribute Description |
|---|---|
| iWFCount | Number of WorkFlow list structures returned |
| ppWFList | Array of WorkFlow structures |

Private Methods

| Method Name | Method Description |
|---|---|
| BOOL bCallAPI( ) | This method is used to call the workflow server API to get the list of workflows for which actions are pending. |
| BOOL bCallFormatter(STF_Tx *pSTFTx) | This method is used to call TxFormatter to format the return values got from workflow server API. Using pSTF_Tx, it gets the pointer to TxFormatter. |

Public Methods

| Method Name | Method Description |
|---|---|
| GetPendingActions(STF_Tx *pSTFTx) | This method is the constructor which accepts the pointer to STF_Tx class which will be used by other methods of this class. |
| virtual BOOL bDoIt( ) | This method calls the private methods bCallAPI( ) and bCallFormatter( ) to process this Transaction. |
| ~GetPendingActions( ) | This method is the destructor which de-initializes all the attributes. |

Class Name: GetAvailableBPs

Class Description

This class is derived from Transaction class and it has methods to call workflow server API and the TxFormatter.

| | |
|---|---|
| Super Class | |
| Transaction | |
| Sub Classes | |
| None | |
| Classes Used | |
| STF_Tx, STFTxKwd. | |
| Attributes | |

| Attribute Name | Attribute Description |
|---|---|
| iBPCount | Number of Business Process list structures returned |
| pBPList | Array of Business Process structures |

Private Methods

| Method Name | Method Description |
|---|---|
| BOOL bCallAPI( ) | This method is used to call the workflow server API to get the list of available business processes. |
| BOOL bCallFormatter(STF_Tx *pSTF_Tx) | This method is used to call TxFormatter to format the return values got from workflow server API. Using pSTF_Tx, it gets the pointer to TxFormatter. |

Public Methods

| Method Name | Method Description |
|---|---|
| GetAvailableBPs(STF_Tx *pSTFTx) | This method is the constructor which accepts the pointer to STF_Tx class which will be used by other methods of this class. |
| virtual BOOL bDoIt( ) | This method calls the private methods bCallAPI( ) and |

| | |
|---|---|
| ~GetAvailableBPs( ) | bCallFormatter( ) to process this Transaction.<br>This method is the destructor which de-initializes all the attributes. |

Class Name: ReturnWFStatus
  Class Description
  This class is derived from Transaction class and has methods to Poll for workflow processor generated Notifications and call workflow server API for getting Workflow status and Bound Data. It also calls the TxFormatter to send the WF status data to the WEA.

| | |
|---|---|
| | Super Class<br>Transaction<br>Sub Classes<br>None<br>Classes Used<br>STFTxKwd, STFTxKwd.<br>Attributes |
| Attribute Name | Attribute Description |
| pStatus | Structure which has the Status string |
| iActCount | Number of ActInfo structures returned |
| ppActInfo | Array of ActInfo structures |
| Private Methods | |
| Method Name | Method Description |
| BOOL bCallAPI( ) | This method is used to call the workflow server API(s) to get the status of the workflow. To get the parameters needed for the workflow server API call(s), it instantiates the STFTxKwd objects for different parameters. To process Bound Data related information, it instantiates Bound Data object. |
| BOOL bCallFormatter(STF_Tx *pSTF_Tx) | This method is used to call TxFormatter to format the return values got from workflow server API. Using pSTF_Tx, it gets the pointer to TxFormatter. |
| Public Methods | |
| Method Name | Method Description |
| ReturnWFStatus(STF_Tx *pSTFTx) | This constructor which accepts the pointer to STF_Tx class which will be used by other methods. |
| virtual BOOL bDoIt( ) | This method polls to Notification events in the STD queue of the server. If it finds an event, the appropriate workflow server APIs are called to obtain WF status. |
| ~ReturnWFStatus( ) | This method is the destructor which de-initializes all the attributes. |

Class Name: Error
  Class Description
  This class is used for error handling. It records the errors during an STF Processor session. The error object is updated with error information by other objects in the STF Processor whenever an error occurs. The error messages are stored in a Resource file (RC) and is loaded as and when required. Whenever a non-fatal error occurs, it will be logged in an ASCII error log file whose path is specified in the STF Processor initialization file (INI file). All fatal errors will be logged and displayed on the STF Processor display as pop-up dialog boxes and after user intervention, the STF Processor will shut down. Please Refer to Sec. 10 for details of error handling in STF Processor. The Error object is Global which is used by all the classes in STF Processor when error logging is required. The format of error logged in the error log file is:

<STF Processor Name><Date:Time><Errorcode ><Error Message>
e.g.
<STF01><12-14-92 12:30:00><00000168><Could not find keyword(s):BPNAME>
Super Class
None
Sub Classes
None
Class Used
INIFile Initialization file class to obtain the error log file specification.
Attributes

| Attribute Name | Attribute Description |
|---|---|
| iErrcode | Error Code (corresponding to string table ID in Resource file) |
| pszErrlogStr | Error log string<br>Whether the error is fatal or not |
| szErrLogFile | Error log file path (from INIFile) |
| pEINIFile | pointer to INI file |
| Public Methods | |
| Method Name | Method Description |
| Error( ) | This method is the constructor which initializes data members. |
| VOID vPutError(LONG lErrCode, BOOL bFatalFlag, PSZ pszParam1, PSZ pszParam2, PSZ Param3) | This method updates Error code and message and writes it into error log file. The error string pszErrLogstr corresponding to iErrCode is accessed from the Resource. If bFatalFlag is TRUE, then the error message is logged and then popped up on the screen. If there is an error in logging, it is treated as a fatal error. The parameters are substituted to the error message loaded from the Resource. These parameters are defaulted to NULL if not specified. |
| PSZ pszGetErrMsg( ) | This method gets the error message stored in pszErrLogStr. |
| ~Error( ) | This method is the destructor which reinitializes all data members. |

We claim:
1. A computer program for interfacing a workflow enabled application to a workflow system comprising:
  a) transporter means for i) receiving from said workflow enabled application incoming data and parsing said received data to extract from said received data workflow transaction information in a predetermined standard transaction format, said predetermined standard transaction format being adapted to address requirements of applications, platforms and medium independent representations and transfers of data related to business processes of said workflow system, and ii) sending to said workflow enabled application outgoing workflow transaction information which has been formatted in said predetermined standard transaction format;

b) transaction processor means for i) processing said workflow transaction information which has been received and parsed by said transporter means to prepare said workflow transaction information for sending to and use by an application program interface of said workflow system, and ii) processing workflow transaction information received from said application program interface of said workflow system for sending to said transporter means to prepare said received workflow transaction information for formatting into said predetermined standard transaction format, sending to and use by said workflow enabled application.

2. The system defined by claim 1 wherein said standard transaction format workflow transaction information received from said workflow enabled application is at least one of an action based transaction and a query based transaction.

3. The system defined by claim 1 wherein said standard transaction format workflow transaction information sent to said workflow enabled application is at least one of requested workflow status, returned bound data, returned available business processes, returned pending actions and notification.

4. The system defined by claim 1 wherein said predetermined standard transaction format comprises an envelope and workflow data.

5. The system defined by claim 2 wherein said action based transaction is one of initiate business process, initiate workflow, act in a workflow and bind data.

6. The system defined by claim 2 wherein said query based transaction is one of request workflow status, get available business processes and get pending actions.

7. The system defined by claim 4 wherein said envelope contains address information which is platform and environment dependent.

8. The system defined by claim 4 wherein said workflow data contains workflow specific data and bound process data.

9. The system defined by claim 8 wherein said workflow specific data includes standard transaction format transaction type and standard transaction format identification.

10. The system defined by claim 8 wherein said bound process data are data elements used by a workflow server for management purposes.

11. The system defined by claim 9 wherein said workflow specific data further comprises at least one of workflow participants, workflow type, transaction type, expected workflow completion date, requested workflow completion date and workflow status.

* * * * *